(12) United States Patent
Hao et al.

(10) Patent No.: US 9,910,192 B2
(45) Date of Patent: Mar. 6, 2018

(54) ROOM-FACING LIGHT REDIRECTING FILMS WITH REDUCED GLARE

(71) Applicant: 3M INNOVATIVE PROPERTIES COMPANY, Saint Paul, MN (US)

(72) Inventors: Bing Hao, Woodbury, MN (US); Manoj Nirmal, Saint Paul, MN (US); Charles A. Marttila, Shoreview, MN (US); Raghunath Padiyath, Woodbury, MN (US); Jonathan F. Mansheim, Woodbury, MN (US); Erik A. Aho, New Richmond, WI (US); Scott M. Tapio, Falcon Heights, MN (US); Owen M. Anderson, Minneapolis, MN (US); Eileen M. F. Haus, Saint Paul, MN (US); John F. Reed, North Oaks, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/519,887

(22) PCT Filed: Oct. 16, 2015

(86) PCT No.: PCT/US2015/055895
§ 371 (c)(1),
(2) Date: Apr. 18, 2017

(87) PCT Pub. No.: WO2016/064667
PCT Pub. Date: Apr. 28, 2016

(65) Prior Publication Data
US 2017/0248741 A1    Aug. 31, 2017

Related U.S. Application Data

(60) Provisional application No. 62/066,307, filed on Oct. 20, 2014.

(51) Int. Cl.
*G02B 5/02* (2006.01)
*E06B 9/24* (2006.01)
*F21S 11/00* (2006.01)

(52) U.S. Cl.
CPC .............. *G02B 5/0231* (2013.01); *E06B 9/24* (2013.01); *G02B 5/0278* (2013.01);
(Continued)

(58) Field of Classification Search
CPC ... F21S 11/007; G02B 5/0231; G02B 5/0278; G02B 3/08; E06B 9/24
(Continued)

(56) References Cited

U.S. PATENT DOCUMENTS 717,782 A  *  1/1903  Wadsworth  ............... F21V 5/02
                                                    359/594
3,841,890 A     10/1974  Coaker
(Continued)

FOREIGN PATENT DOCUMENTS

JP      2011-191387       9/2011
WO      WO 97/31276       8/1997
(Continued)

OTHER PUBLICATIONS

International Search Report for PCT/US2015/055895 dated Jan. 6, 2016.
(Continued)

*Primary Examiner* — Christopher Mahoney
(74) *Attorney, Agent, or Firm* — Eric D. Levinson

(57) ABSTRACT

The present disclosure relates generally to light management constructions comprising microstructured prismatic elements useful in the preparation of room-facing light redirecting films having reduced glare.

16 Claims, 8 Drawing Sheets

(52) U.S. Cl.
CPC .............. *E06B 2009/2417* (2013.01); *E06B 2009/2482* (2013.01); *F21S 11/007* (2013.01)

(58) Field of Classification Search
USPC .................................... 359/595, 459, 460
See application file for complete search history.

(56) References Cited

U.S. PATENT DOCUMENTS

| | | | |
|---|---|---|---|
| 4,144,217 | A | 3/1979 | Snelgrove |
| 4,411,493 | A * | 10/1983 | Miller .............. F21S 11/00 359/595 |
| 4,588,258 | A | 5/1986 | Hoopman |
| 4,693,935 | A | 9/1987 | Mazurek |
| 5,223,465 | A | 6/1993 | Ueki |
| RE34,605 | E | 5/1994 | Schrenk |
| 5,360,659 | A | 11/1994 | Arends |
| 5,551,042 | A | 8/1996 | Lea |
| 5,579,162 | A | 11/1996 | Bjornard |
| 5,882,774 | A | 3/1999 | Jonza |
| 6,049,419 | A | 4/2000 | Wheatley |
| 6,288,172 | B1 | 9/2001 | Goetz |
| 6,322,236 | B1 | 11/2001 | Campbell |
| 6,390,629 | B1 | 5/2002 | Mimura |
| 6,456,437 | B1 | 9/2002 | Lea |
| 6,845,805 | B1 | 1/2005 | Koster |
| 6,887,917 | B2 | 5/2005 | Yang |
| 7,116,476 | B2 * | 10/2006 | Suzuki .............. G02B 3/08 359/457 |
| 2007/0024994 | A1 | 2/2007 | Whitney |
| 2007/0279773 | A1 | 12/2007 | Johnson |
| 2008/0291541 | A1 | 11/2008 | Padiyath |
| 2008/0292820 | A1 | 11/2008 | Padiyath |
| 2009/0161346 | A1 | 6/2009 | Ahn |
| 2013/0038928 | A1 | 2/2013 | Padiyath |
| 2013/0182331 | A1 | 7/2013 | Hebrink |
| 2014/0104689 | A1 | 4/2014 | Padiyath |
| 2014/0198390 | A1 | 7/2014 | Padiyath |
| 2014/0211331 | A1 | 7/2014 | Padiyath |

FOREIGN PATENT DOCUMENTS

| | | |
|---|---|---|
| WO | WO 2011/084303 | 7/2011 |
| WO | WO 2011/084391 | 7/2011 |
| WO | WO 2012/134787 | 10/2012 |
| WO | WO 2013/158475 | 10/2013 |
| WO | WO 2014/093119 | 6/2014 |
| WO | WO 2016/064621 | 4/2016 |
| WO | WO 2016/064667 | 4/2016 |
| WO | WO 2016/064669 | 4/2016 |

OTHER PUBLICATIONS

International Search Report for PCT/US2015/055908 dated Jan. 11, 2016.

International Search Report for PCT/US2015/055274 dated Jan. 6, 2016.

* cited by examiner

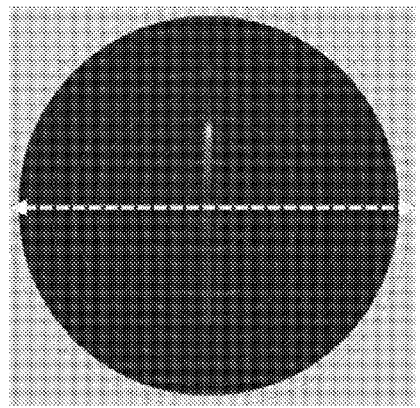 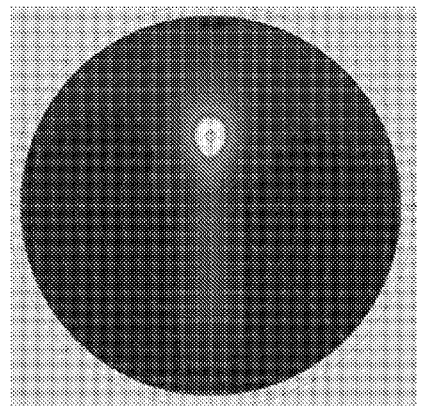
*Fig. 5A*  *Fig. 5B*
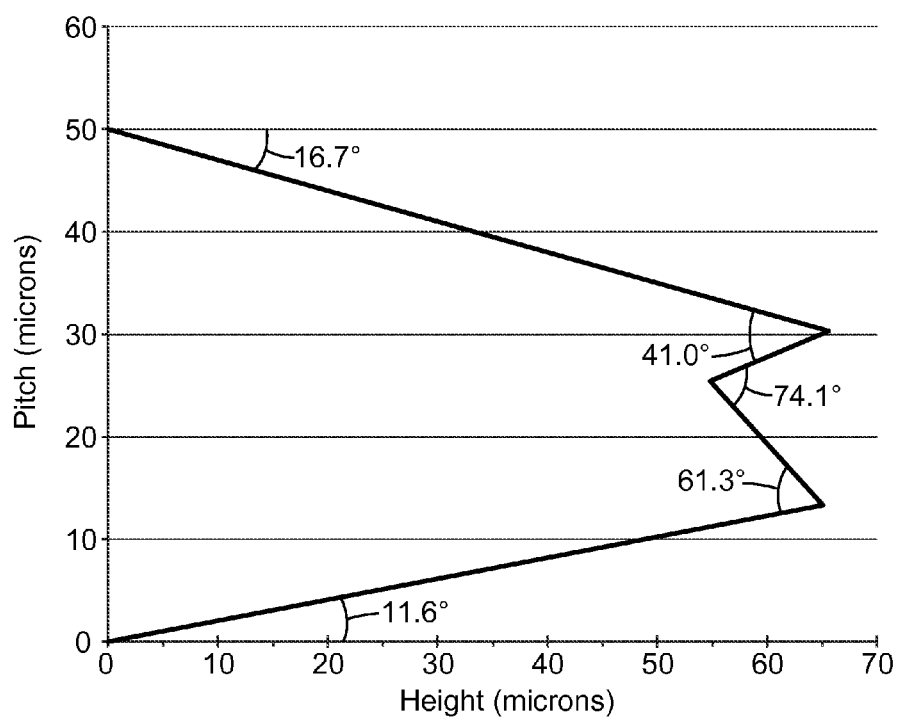
*Fig. 6*

ROOM-FACING LIGHT REDIRECTING FILMS WITH REDUCED GLARE

CROSS REFERENCE TO RELATED APPLICATIONS

This application is a national stage filing under 35 U.S.C. 371 of International Application No. PCT/US2015/055895, filed Oct. 16, 2015, which claims the benefit of U.S. Provisional Application No. 62/066,307, filed Oct. 20, 2014. The disclosures of both applications are incorporated by reference in their entirety herein.

The present disclosure relates generally to light management constructions comprising microstructured prismatic elements useful in the preparation of room-facing light redirecting films having reduced glare.

BACKGROUND

A variety of approaches are used to reduce energy consumption in buildings. Among those approaches is the more efficient use of sunlight to provide lighting inside buildings. One technique for supplying light inside of buildings, such as in offices, residential buildings, etc. is the redirection of incoming sunlight. Because sunlight enters windows at a downward angle, much of this light is not useful in illuminating a room. However, if the incoming downward light rays can be redirected upward such that they strike the ceiling, the light can be more usefully employed in lighting the room.

Daylight Redirection Films (DRFs), provide natural lighting by redirecting incoming sunlight upward, onto the ceiling. This can lead to significant energy savings by reducing the need for artificial lights. Daylight Redirection Films can consist of linear optical microstructures that reflect incoming sunlight onto the ceiling. DRFs are typically installed on the upper clerestory section of windows 7' and above. A typical configuration is shown on FIG. 1, where a DRF 101 on a window glazing 110 redirects sunlight 120 upward as deflected light 124.

Sunlight that would normally land on the floor can be used to provide natural lighting by using suitable constructions involving daylight redirecting films. FIG. 2 shows an example of the amount of light that can be redirected from the floor to the ceiling by daylight redirecting film 201, which has been applied to the glazing of a window. The arrow in FIG. 2B indicates the light that has been redirected from the floor to the ceiling by the daylight redirecting film 201.

Buildings (residential & commercial) account for about 40% of all energy consumed and lighting represents about 30% of that energy. Substituting even a fraction of artificial lighting with natural light can yield significant energy savings. The Illuminating Engineering Society of North America (IES) has developed a comprehensive daylight illuminance metric, named spatial Daylight Autonomy or sDA that characterizes the efficacy of daylighting systems. An extensive study conducted at several Dept. of Defense sites across the U.S. demonstrated that installation of 3M DRF increases sDA values. In addition to energy savings, daylighting has soft benefits related to increased worker productivity, elevated test scores, and improved mood and energy.

While one of the main incentives for using daylight redirecting films is energy savings, visual comfort needs to be taken in account. The inventors have observed that, as shown in FIG. 1, while most of the sunlight is directed upwards, a fraction goes downwards (not shown). This downward light can cause glare for the occupants. The present disclosure teaches, inter alia, new designs for microstructured prismatic elements for light redirecting film that reduce glare.

SUMMARY

The present disclosure relates generally to light management constructions comprising microstructured prismatic elements useful in the preparation of room-facing light redirecting films having reduced glare.

The light management constructions of the present disclosure comprise an optical substrate having a first major surface and a second major surface opposite the first major surface. For room-facing constructions, the first major surface of the optical substrate comprises one or more microstructured prismatic elements. The microstructured prismatic elements have a double-peak shape that the inventors have found reduces glare, even at low sun angles. Typically, the microstructured prismatic elements are part of an ordered arrangement on a suitable substrate and together form a light redirecting film. In some embodiments, the ordered arrangement of a plurality of microstructured prismatic elements can form an array of microstructures. The array can have a variety of elements. For example, the array can be linear (i.e. a series of parallel lines), sinusoidal (i.e. a series of wavy lines), random, or combinations thereof. While a wide variety of arrays are possible, it is desirable that the array elements are discrete, i.e., that the array elements do not intersect or overlap.

Films and windows comprising the microstructured prismatic elements disclosed in this application are also within the scope of the present disclosure.

The use of films permits the light redirection function to be built into existing windows, for example by using a lamination step without the need to: (a) etch or otherwise permanently physically modify the window substrates, or (b) prepare a window or glazing having light redirecting properties at the glass manufacturer's facilities. Additionally, the light management films may provide additional functions such as, for example, shatter resistance and infrared or ultraviolet reflection or absorption by judicious selection of additional layers or incorporation of suitable additives with the existing substrate(s) of a light redirecting film. In certain embodiments, light management features can be built into one or more glazing substrates directly, precluding the need for the use of an additional film layer.

All scientific and technical terms used herein have meanings commonly used in the art unless otherwise specified. The definitions provided herein are to facilitate understanding of certain terms used frequently in this application and are not meant to exclude a reasonable interpretation of those terms in the context of the present disclosure.

Unless otherwise indicated, all numbers in the description and the claims expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

The recitation of numerical ranges by endpoints includes all numbers subsumed within that range (e.g. a range from 1 to 5 includes, for instance, 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "adhesive" as used herein refers to polymeric compositions useful to adhere together two components (adherents). Examples of adhesives are heat activated adhesives, and pressure sensitive adhesives.

The term "window film adhesive layer" as used herein refers to a layer comprising an adhesive suitable to bond a film to a window or glazing, such as, for example, a pressure sensitive adhesive.

The term "adjacent" as used herein refers to the relative position of two elements, such as layers in a film construction, that are close to each other and may or may not be necessarily in contact with each other and may have one or more layers separating the two elements, as understood by the context in which "adjacent" appears.

The term "immediately adjacent" as used herein refers to the relative position of two elements, such as layers in a film construction, that are immediately next to each other without having any other layers separating the two elements, as understood by the context in which "immediately adjacent" appears.

The term "construction" or "assembly" are used interchangeably in this application when referring to a multilayer film, in which the different layers can be coextruded, laminated, coated one over another, or any combination thereof.

The term "light redirecting layer" as used herein refers to a layer that comprises microstructured prismatic elements.

The term "light redirecting film" as used herein refers to a film that comprises one or more light redirecting layers and optionally other additional layers, such as substrates or other functional layers.

Light redirection, in general, may be called daylight redirection, sunlight redirection, or solar light redirection when the source of light is the sun.

The term "film" as used herein refers, depending on the context, to either a single layer article or to a multilayer construction, where the different layers may have been laminated, extruded, coated, or any combination thereof.

The term "microstructured prismatic element" as used herein refers to an engineered optical element, wherein at least 2 dimensions of the features are microscopic, that redirects input light with certain angular characteristics into output light with certain angular characteristics. In certain embodiments, the height of the microstructured prismatic element is less than 1000 microns. A microstructured prismatic element may comprise a single peak structure, a multipeak structure, such as a double peak structure, structures comprising one or more curves, or combinations thereof.

The term "diffusing agent" as used herein refers to features or additives incorporated in the article that increase the angular spread of light passing through the same article.

The term "optical substrate" as used herein refers to substrates that are at least optically transparent, and which may be optically clear and may also produce additional optical effects. Examples of optical substrates include optical films and glazing substrates, such as glass plates, polyolefin plates, polyimide plates, polycarbonate plates, polyester plates, and polyacrylate plates. The description below related to the use of optical films also applies to the use of glazing substrates.

The term "optical film" as used herein refers to films that are at least optically transparent, may be optically clear and may also produce additional optical effects. Examples of additional optical effects include, for example, light diffusion, light polarization or reflection of certain wavelengths of light. The optical film may be any suitable film that has high optical transparency in the visible light region of the spectrum. The optical film may be a single layer film or a multilayer film construction.

The term "optically transparent" as used herein refers to films or constructions that appear to be transparent to the naked human eye. The term "optically clear" as used herein refers to film or article that has a high light transmittance over at least a portion of the visible light spectrum (about 400 to about 700 nanometers), and that exhibits low haze. An optically clear material often has a luminous transmission of at least about 90 percent and a haze of less than about 2 percent in the 400 to 700 nm wavelength range. Both the luminous transmission and the haze can be determined using, for example, the method of ASTM-D 1003-95.

The term "ordered arrangement" as used herein to describe a plurality of structures, refers to a regular, repeated pattern of structures.

The term "glare" as used herein refers to the amount of light exiting an optical entity (for example optical film) oriented vertically at angles from 0 to 45 degrees downward with respect a horizontal reference line.

The term "glare ratio" as used herein refers to the ratio of "glare" as defined above to the "total energy of the output light rays" as defined in this disclosure.

The term "substantially straight" in the context of a side of a microstructured prismatic element as used herein refers to a side that is mostly straight but that could deviate from a straight line due to inaccuracies introduced by manufacturing processes or may intentionally have minor curvature (i.e. large radius) to spread redirected light.

The term "incident light rays" as used herein refers to the bundle of rays that impinges onto an optical entity.

The term "total internal reflection" as used herein refers to the phenomenon that when a propagating electromagnetic wave (including light) strikes a medium boundary at an angle greater than a particular critical angle, the wave is entirely reflected. For total internal reflection to happen, the refractive index of the other side of the medium should be lower than that of the incident medium.

The term "output light rays" as used herein refers to the rays transmitted through, and exiting, an optical entity.

The term "incident angle" as used herein refers to the angle of the incident rays measured from a reference plane normal to a boundary.

The term "total energy of the output light rays" as used herein refers to the amount of energy transmitted through an optical entity oriented vertically, wherein the output light rays are those exiting at angles from (−) 90 to (+) 90 degrees with respect a horizontal reference line.

As used herein, the index of refraction of a material 1 ("RI1") is said to "match" the index of refraction of a material 2 ("RI2") if the value RI1 is within +/−5% of RI2.

For the following definitions of "room-facing" and "sun-facing," it is assumed that a light redirecting layer has a first major surface and second major surface opposite the first major surface and that the first major surface of the light redirecting film comprises microstructured prismatic elements.

As used herein, the term "room-facing," in the context of a light redirecting film or a construction comprising a light redirecting film, refers to a film or construction where the incident light rays pass through the major surface of the light redirecting film not containing the microstructured prismatic elements before they pass through the major surface that contains the microstructured prismatic elements. In the most typical configuration, when the light redirecting film is located on an exterior window (i.e., when the window faces the exterior of a building), the microstructured prismatic elements in a "room-facing" configuration are oriented facing the interior of the room. However, the term "room-facing," as defined herein can also refer to configurations where the light redirecting film is on a glazing, or other kind of substrate, that does not face the exterior of the building, but is in between two interior areas.

As used herein, the term "sun-facing," in the context of a light redirecting film or a construction comprising a light redirecting film, refers to a film or construction where the incident light rays pass through the major surface of the light redirecting film containing the microstructured prismatic elements before they pass through the other major surface (the major surface not containing the microstructured prismatic elements). In the most typical configuration, when the light redirecting film is located on an exterior window (i.e., when the window faces the exterior of a building), the microstructured prismatic elements in a "sun-facing" configuration are oriented facing the sun. However, the term "sun-facing," as defined herein can also refer to configurations where the light redirecting film is on a glazing that does not face the exterior of the building, but is in between two interior areas.

The term "visible light" as used herein refers to refers to radiation in the visible spectrum, which in this disclosure is taken to be from 400 nm to 700 nm.

BRIEF DESCRIPTION OF THE DRAWINGS

FIG. 5 shows the effect of a diffuser layer on a light redirecting film.

FIG. 6 shows a cross-section of an embodiment of a room-facing microstructured prismatic element as described in Example 1.

ELEMENT NUMBERS

Figure 1:
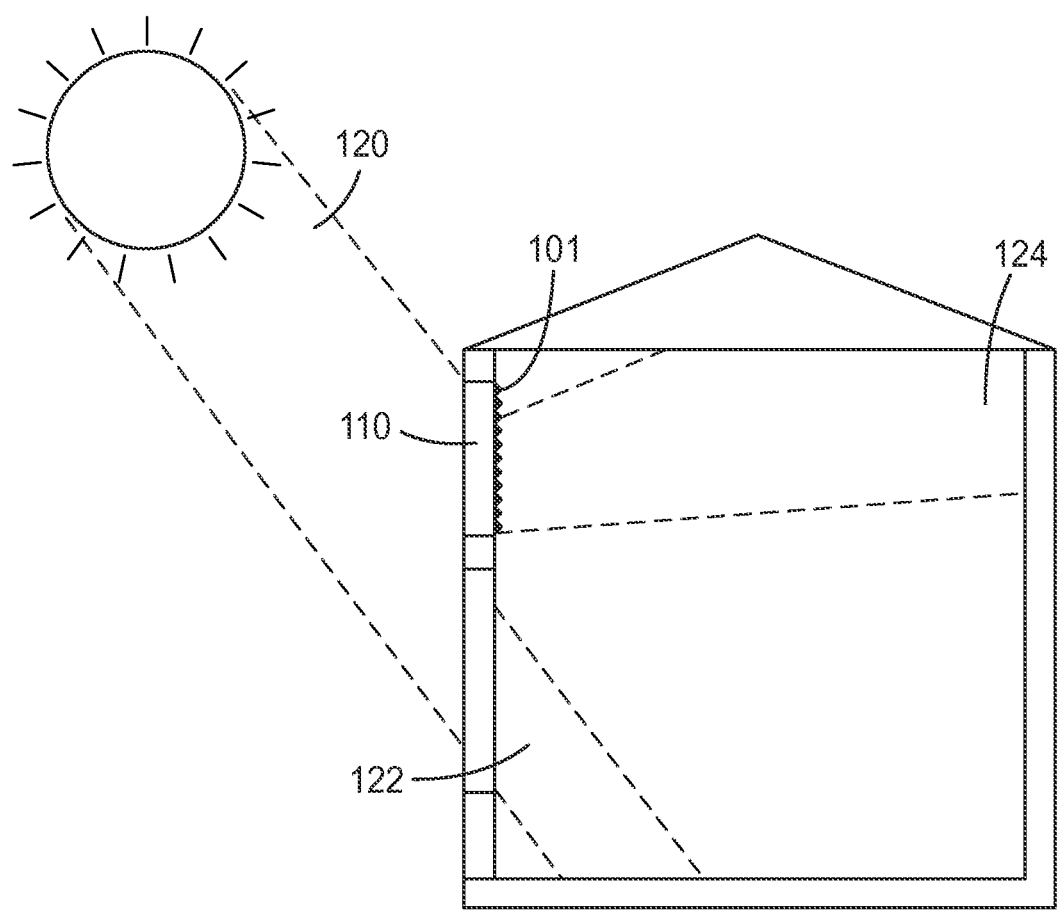
FIG. 1 is a typical configuration showing the use of a light redirecting film (LRF), demonstrating light redirection after the light passed through a room-facing light redirecting layer.
Figure 2A:
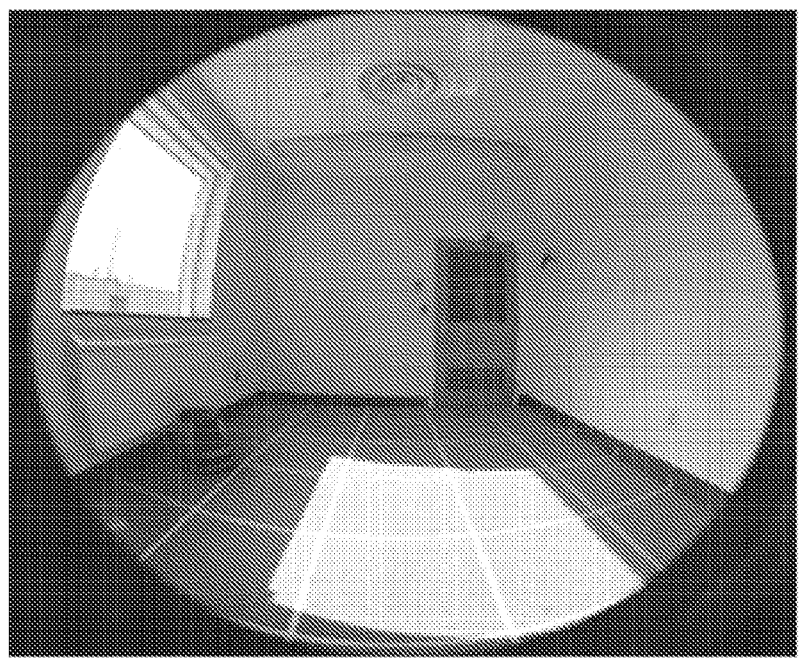
FIG. 2 shows an example of the amount of light that can be redirected from the floor to the ceiling by the use of a LRF.
Figure 2B:
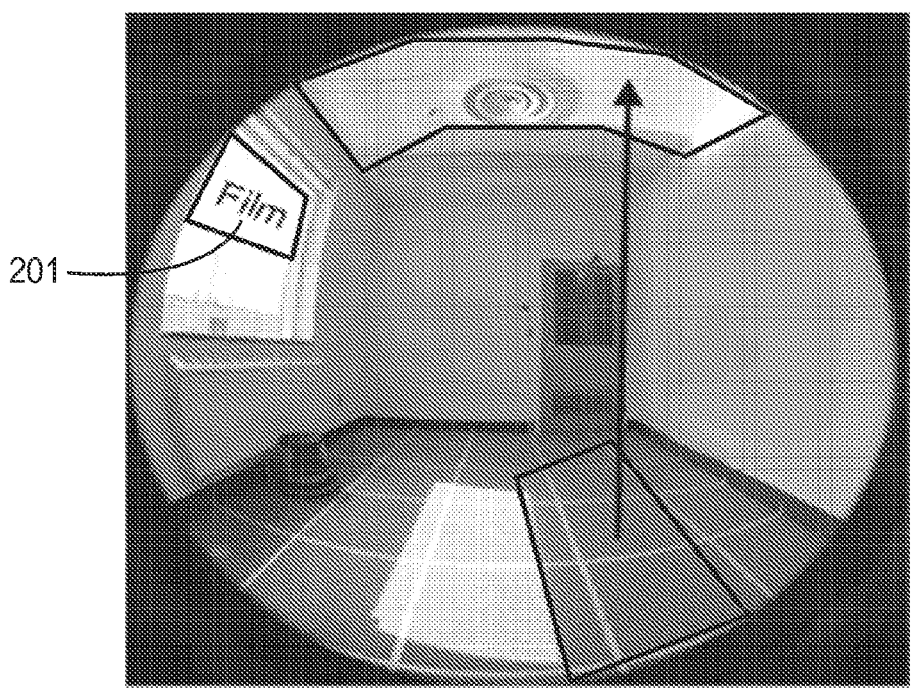

20 Process equipment for making film comprising microstructured prismatic elements
21 Substrate
22 Supply roll of substrate
23 Roller
24 Microtooling on molding surface of tool
25 Molding surface of tool
26 Coating die
27 Tool
28 Roller
29 Actinic radiation source
30 Microstructured composite storage roll
31 Microstructured composite
101 Daylight redirection film
110 Window glazing
120 Sunlight
122 Sunlight not passing through light redirection film
124 Sunlight deflected upward by light redirection film
201 Daylight redirection film applied to window glazing
401 First major surface of the optical substrate
402 Second major surface of the optical substrate
403 Optical substrate
404 Reference X-axis
405 Reference Y-axis
406 Reference plane
407 Valley angle
408 Light incidence angle
410 Microstructured prismatic element
412 Sunlight In the following description, reference is made to the accompanying drawings herein described. In certain cases, the Figures may depict, by way of illustration, several specific embodiments of the present disclosure. It is to be understood that other embodiments different from those explicitly depicted in the Figures are contemplated and may be made without departing from the scope or spirit of the present disclosure. The following detailed description, therefore, is not to be taken in a limiting sense.

DETAILED DESCRIPTION

Windows and similar constructions are used to provide natural sunlight to rooms, corridors, and other areas in commercial and residential buildings. However, the angle that natural sunlight falls upon windows is such that typically the light may not penetrate far into the room or corridor. Additionally, since the incoming light may be unpleasantly strong near the window, users sitting near the window may be induced to close shutters, blinds or curtains and thus eliminate this potential source of room illumination. Therefore constructions that can redirect sunlight from the normal incident angle to a direction towards the ceiling would be desirable.

Figure 3:
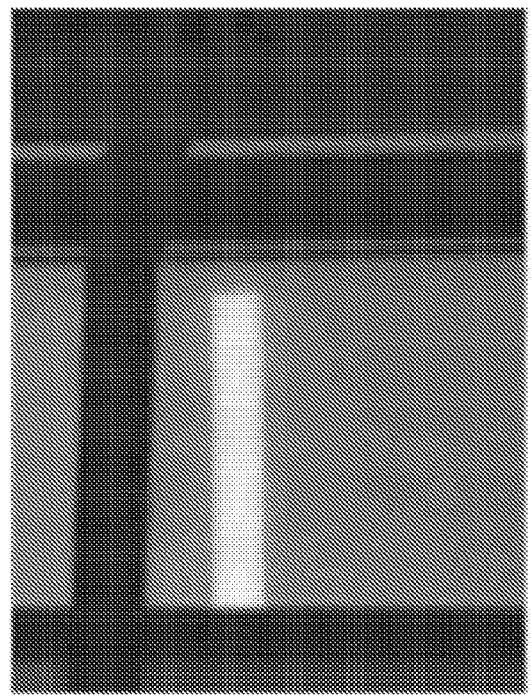
FIG. 3 shows a visual example of a solar column (white bar) on a window.

The inventors have observed that, while many of the light redirecting films currently available redirect most of the sunlight upwards, many of those films allow a fraction of the light to go downwards. This downward light can cause glare for the user. In addition, since the microstructured prismatic elements are typically linear and oriented horizontally the incoming rays are refracted/reflected mainly in the vertical direction. Sunlight is highly collimated with about a 0.5 degree spread and appears as a solar disk. In that case, the effect of the light redirecting film is to spread this light vertically to form a solar column, such as that shown in FIG. 3, in which the solar column appears as a white vertical band. Both the total fraction of downward directed light and brightness of the solar column contribute to glare, which causes visual discomfort. The brightness of the solar column depends on its angular spread. The microstructured prismatic elements of this disclosure are designed to reduce the amount of glare associated with light redirecting films.

Figure 4:
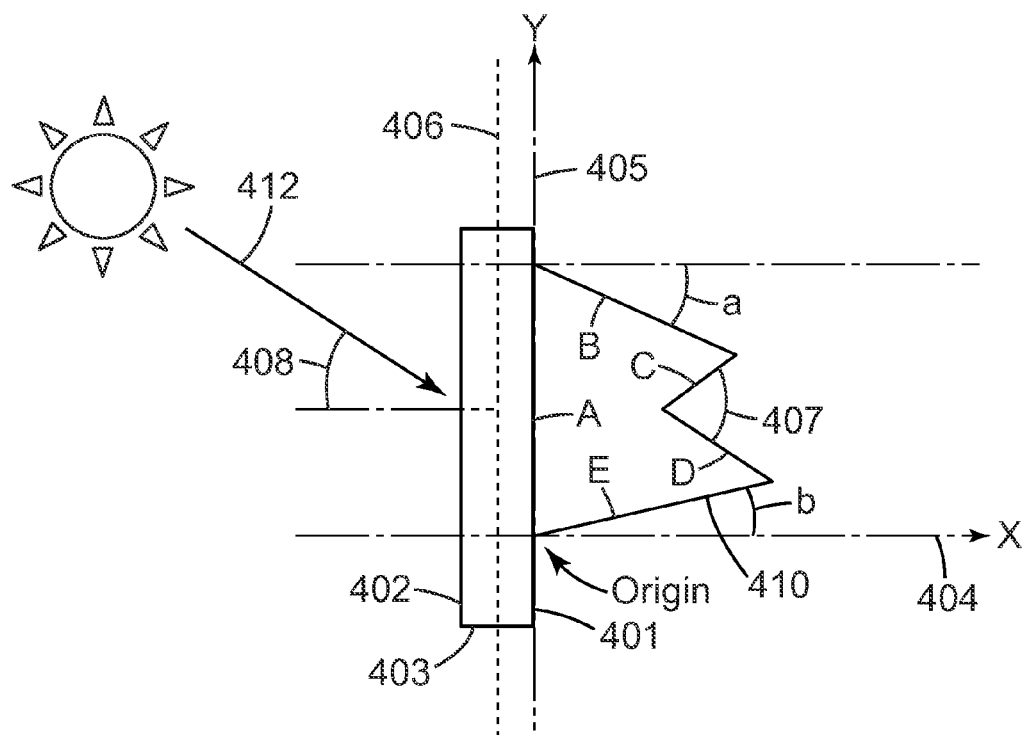
FIG. 4 shows a schematic diagram of a room-facing microstructured prismatic element of the present disclosure.

The plurality of microstructured prismatic elements of this disclosure is designed to effectively redirect incoming solar light towards the ceiling of a room. The entire surface of the optical substrate may contain the microstructured prismatic elements, or the microstructured prismatic elements may be present on only a portion of the surface of the optical substrate. In embodiments of the invention, the microstructured prismatic elements comprise 5 sides and have a double peak shape, as illustrated in FIG. 4. The microstructured prismatic elements may be viewed as an orderly array of protrusions arising from the surface of the optical film.

In certain embodiments, a light management construction of this disclosure comprises:
- an optical substrate 403 having a first major surface 401 and a second major surface 402 opposite the first major surface;
- wherein a reference plane 406 is defined as being parallel to, and in between, the first and second major surfaces of the optical substrate;
- wherein a reference x axis 404 is defined as being normal to the reference plane;
- wherein a reference y axis 405 is defined as being perpendicular to the reference x axis and falling within a plane that is parallel to the reference plane;
- wherein the reference x axis and the reference y axis intersect each other at a position defined as the origin, which is on the first major surface of the optical substrate;
- wherein the first major surface of the optical substrate comprises one or more microstructured prismatic elements 410;
- wherein the positive direction of the reference x axis is defined as the direction from the origin towards the one or more microstructured prismatic elements;
- wherein the positive direction of the reference y axis is defined as the direction from the origin in a counter-clock wise direction from the positive direction of the reference x axis;
- wherein a cross section of a microstructured prismatic element 410 has a double peak shape with five substantially straight sides (sides A, B, C, D, and E) such that:
  - each side of a microstructured prismatic element has a first end and a second end;
  - side A of the microstructured prismatic element is parallel to and adjacent to the first major surface of the optical substrate and extends from the origin, where the first end of side A is located, in the positive direction of the reference y axis;
  - the first end of side B of the microstructured prismatic element is connected to the second end of side A and the second end of side B is connected to the first end of side C;
    - wherein side B extends from the point that is connected to side A towards the positive direction of the reference x axis;
    - wherein side B forms an angle alpha with a line parallel to the reference x axis that passes through the point where side A and side B connect;
  - the second end of side C of the microstructured prismatic element is connected to the first end side D;
    - wherein side C extends from the point of intersection with side B in a clockwise direction;
  - the second end of side D of the microstructured prismatic element is connected to the first end of side E;
    - side C and side D define a valley angle 407, measured from side C in a clockwise direction towards side D;
  - the second end of side E of the microstructured prismatic element 410 is connected to the first end side A;
    - wherein side E forms an angle beta with the reference x axis that passes through the point where side A and side E connect;
  - wherein the valley angle is from 10 to 170 degrees;
  - wherein the shortest distance from side A to the highest point of the microstructured prismatic element defines the height of the microstructured prismatic element;
  - wherein the length of side A defines the pitch of microstructured prismatic element;
  - wherein the aspect ratio of the microstructured prismatic element defined by dividing the height by the pitch is 1.55 or less;
  - wherein the distance between a normal line to side A that intersects the point where side B and side C connect and a normal line to side A that intersects the point where side C and side D connect defines the peak separation;
  - wherein the peak separation is greater than 10% of the pitch;
- wherein when incident light rays 412 pass through the second major surface 402 of the optical substrate 403 before they pass through the first major surface of the optical substrate and enter the microstructured prismatic element, total internal reflection within the microstructured prismatic element occurs at side E when the angle of the incident light rays is 65 degrees or less when measured clockwise from a line parallel to the reference x axis;
- wherein when incident light rays pass through the second major surface of the optical substrate before they pass through the first major surface of the optical substrate and exit the light management construction as output light rays, the energy of the output light rays exiting at angles from 0 to 45 degrees measured clockwise from a line parallel to the reference x axis divided by the total energy of the output light rays is less than 25% at any value of an incident angle 408 of the incident light rays 412 from 10 to 65 degrees measured clockwise from a line parallel to the reference x axis.

In some embodiments, a light management construction comprises one or more microstructured prismatic elements having a pitch from 20 to 60 microns. In other embodiments, the pitch is from 35 to 45 microns, or from 45 to 55 microns, or about 40 microns, or about 50 microns.

In some embodiments, a light management construction comprises one or more microstructured prismatic elements having a height of less than 100 microns. In other embodiments, the height is from 25 to 100 microns, or from 30 to 80 microns, or from 40 to 70 microns, or from 50 to 70 microns.

In some embodiments, a light management construction comprises one or more microstructured prismatic elements having an aspect ratio of from 1.1 to 1.5. In other embodiments, the aspect ratio is from 1.2 to 1.4, or from 1.15 to 1.25, or from 1.25 to 1.35, or from 1.35 to 1.45, or from 1.45 to 1.55, or about 1.2, or about 1.3, or about 1.4, or about 1.5.

In some embodiments, a light management construction comprises one or more microstructured prismatic elements having a valley angle from 20 degrees to 150 degrees. In other embodiments, the valley angle is from 40 degrees to 90 degrees.

In some embodiments, a light management construction comprises one or more microstructured prismatic elements having a peak separation greater than 15% of the pitch. In other embodiments, the peak separation is greater than 20% of the pitch.

In some embodiments, a light management construction comprises one or more microstructured prismatic elements having an angle alpha from 3 to 30 degrees. In other embodiments, the angle alpha is from 5 to 28 degrees.

In some embodiments, a light management construction comprises one or more microstructured prismatic elements having an angle beta from 5 to 15 degrees. In other embodiments, the angle beta is from 5 to 10 degrees, or from 7 to 10 degrees, or 10 degrees or less, or 9 degrees or less, or 8 degrees or less, or 7 degrees or less, or 6 degrees or less.

In certain embodiments, the amount of glare of a light management construction of this disclosure is low, such that when incident light rays pass through the second major surface of the optical substrate before they pass through the first major surface of the optical substrate and exit the light management construction as output light rays, the energy of the output light rays exiting at angles from 0 to 45 degrees measured clockwise from a line parallel to the reference x axis divided by the total energy of the output light rays is less than 18% at any value of an incident angle of the incident light rays from 10 to 65 degrees measured clockwise from a line parallel to the reference x axis.

In other embodiments, the amount of glare of a light management construction of this disclosure is low, such that when incident light rays pass through the second major surface of the optical substrate before they pass through the first major surface of the optical substrate and exit the light management construction as output light rays, the energy of the output light rays exiting at angles from 0 to 45 degrees measured clockwise from a line parallel to the reference x axis divided by the total energy of the output light rays is less than 15% at any value of an incident angle of the incident light rays from 10 to 65 degrees measured clockwise from a line parallel to the reference x axis.

In other embodiments, the amount of glare of a light management construction of this disclosure is low, such that when incident light rays pass through the second major surface of the optical substrate before they pass through the first major surface of the optical substrate and exit the light management construction as output light rays, the energy of the output light rays exiting at angles from 0 to 45 degrees measured clockwise from a line parallel to the reference x axis divided by the total energy of the output light rays is less than 13% at any value of an incident angle of the incident light rays from 10 to 65 degrees measured clockwise from a line parallel to the reference x axis.

In other embodiments, the amount of glare of a light management construction of this disclosure is low, such that when incident light rays pass through the second major surface of the optical substrate before they pass through the first major surface of the optical substrate and exit the light management construction as output light rays, the energy of the output light rays exiting at angles from 0 to 45 degrees measured clockwise from a line parallel to the reference x axis divided by the total energy of the output light rays is less than 10% at any value of an incident angle of the incident light rays from 10 to 65 degrees measured clockwise from a line parallel to the reference x axis.

In some embodiments, when incident light rays pass through the second surface of the optical substrate before they pass through the first major surface of the optical substrate of a light management construction according to this disclosure, and then those incident light rays enter the microstructured prismatic element, the total internal reflection within the microstructured prismatic element occurs at side E when the angle of the incident light rays is 68 degrees or less.

In some embodiments, when incident light rays pass through the second surface of the optical substrate before they pass through the first major surface of the optical substrate of a light management construction according to this disclosure, and then those incident light rays enter the microstructured prismatic element, the total internal reflection within the microstructured prismatic element occurs at side E when the angle of the incident light rays is 70 degrees or less.

In some embodiments, when incident light rays pass through the second surface of the optical substrate before they pass through the first major surface of the optical substrate of a light management construction according to this disclosure, and then those incident light rays enter the microstructured prismatic element, the total internal reflection within the microstructured prismatic element occurs at side E when the angle of the incident light rays is 75 degrees or less.

In some embodiments, when incident light rays pass through the second surface of the optical substrate before they pass through the first major surface of the optical substrate of a light management construction according to this disclosure, and then those incident light rays enter the microstructured prismatic element, the total internal reflection within the microstructured prismatic element occurs at side E when the angle of the incident light rays is 80 degrees or less.

In some embodiments, when incident light rays pass through the second surface of the optical substrate before they pass through the first major surface of the optical substrate of a light management construction according to this disclosure, and then those incident light rays enter the microstructured prismatic element, the total internal reflection within the microstructured prismatic element occurs at side E when the angle of the incident light rays is 85 degrees or less.

In other embodiments, a light management construction comprises one or more microstructured prismatic elements having a microstructured prismatic element that is symmetric with respect to an axis that is parallel to the reference x axis and intersects side A at its middle point.

In other embodiments, a light management construction comprises one or more symmetric microstructured prismatic elements having a pitch from 20 to 60 microns.

In other embodiments, a light management construction comprises one or more symmetric microstructured prismatic elements having a height from 30 to 90 microns.

In other embodiments, a light management construction comprises one or more symmetric microstructured prismatic elements having an aspect ratio less than 1.5.

In other embodiments, a light management construction comprises one or more symmetric microstructured prismatic elements having a valley angle from 30 to 90 degrees.

In other embodiments, a light management construction comprises one or more symmetric microstructured prismatic elements having an angle alpha from 5 to 12 degrees.

In other embodiments, a light management construction comprises one or more symmetric microstructured prismatic elements, wherein the peaks and/or valleys of the microstructured prismatic element are chamfered.

In certain embodiments, the light management construction comprises a gap in between microstructured prismatic elements. In some embodiments, the gap is a small fraction of the pitch, for example 1-2%. In some other embodiments, the gap could be very large, for example much larger than the pitch to allow direct view through the light management construction.

In certain embodiments, a light management construction comprises one or more microstructured prismatic elements wherein:
 the pitch is from 35 to 55 microns;
 the height is from 45 to 78 microns;
 the aspect ratio is from 1.2 to 1.5;
 the valley angle is from 60 to 80 degrees;
 the angle alpha is from 15 to 25 degrees; and
 the angle beta is from 5 to 15 degrees.

In certain embodiments, a light management construction comprises one or more symmetric microstructured prismatic elements wherein:
 the pitch is about 40 microns;
 the height is about 55 microns;
 the aspect ratio is about 1.4;
 the valley angle is about 72 degrees;
 the angle alpha is about 17 degrees; and
 the angle beta is about 10 degrees.

In certain embodiments, a light management construction comprises one or more symmetric microstructured prismatic elements wherein:
 the pitch is from 35 to 55 microns;
 the height is from 45 to 78 microns;
 the aspect ratio is from 1.2 to 1.5;
 the valley angle is from 60 to 80 degrees;
 the angle alpha is from 5 to 15 degrees; and
 the angle beta is from 5 to 15 degrees.

In certain embodiments, a light management construction comprises one or more microstructured prismatic elements wherein:
 the pitch is about 40 microns;
 the height is about 55 microns;
 the aspect ratio is about 1.4;
 the valley angle is about 72 degrees;
 the angle alpha is about 10 degrees; and
 the angle beta is about 10 degrees.

In certain embodiments, a light management construction comprises one or more microstructured prismatic elements, wherein:
 the pitch is from 35 to 55 microns;
 the height is from 45 to 78 microns;
 the aspect ratio is from 1.2 to 1.4;
 the valley angle is from 60 to 80 degrees;
 the angle alpha is from 10 to 25 degrees; and
 the angle beta is from 5 to 16 degrees.

In certain embodiments, a light management construction comprises one or more microstructured prismatic elements wherein:
 the pitch is about 40 microns;
 the height is about 52 microns;
 the aspect ratio is about 1.3;
 the valley angle is about 74 degrees;
 the angle alpha is about 17 degrees; and
 the angle beta is about 12 degrees.

Light Redirecting Films

Typically, the optical film or multilayer optical film that serves as a substrate for the microstructured prismatic elements is prepared from polymeric materials that permit the film to be optically clear. Examples of suitable polymeric materials include, for example, polyolefins such as polyethylene and polypropylene, polyvinyl chloride, polyesters such as polyethylene terephthalate (PET), polyamides, polyurethanes, cellulose acetate, ethyl cellulose, polyacrylates, polycarbonates, silicones, and combinations and blends thereof. The optical film may contain other components besides the polymeric material, such as fillers, stabilizers, antioxidants, plasticizers and the like. In some embodiments, the optical film may comprise a stabilizer such as a UV absorber (UVA) or hindered amine light stabilizer (HALS). Suitable UVAs include, for example, benzotriazole UVAs such as the compounds available from Ciba, Tarrytown, N.Y. as TINUVIN P, 213, 234, 326, 327, 328, 405 and 571. Suitable HALS include compounds available from Ciba, Tarrytown, N.Y. as TINUVIN 123, 144, and 292.

A microstructure layer comprising the ordered arrangement of microstructured prismatic elements on a major surface of the optical substrate may be formed in a variety of ways. Typically, the microstructure layer comprises a thermoplastic or a thermoset material.

The microstructured constructions described above are manufactured using various methods, including embossing, extrusion, casting and curing, compression molding and injection molding. One method of embossing, suitable for forming microstructured films, is described in U.S. Pat. No. 6,322,236, which includes diamond turning techniques to form a patterned roll which is then used for embossing a microstructured surface onto a film. A similar method may be used to form the constructions described above having an ordered arrangement of a plurality of asymmetrical structures.

Other approaches may be followed for producing a film having a microstructured surface with a repeating pattern. For example, the film may be injection molded using a mold having a particular pattern thereon. The resulting injection molded film has a surface that is the complement of the pattern in the mold. In another and similar approach, the film may be compression molded.

In some embodiments, the microstructured constructions are prepared using an approach called casting and curing. In casting and curing, a curable mixture is coated onto a surface to which a microstructuring tool is applied or the mixture is coated into a microstructuring tool and the coated microstructuring tool is contacted to a surface. The curable mixture is then cured and the tooling is removed to provide a microstructured surface. Examples of suitable microstructuring tools include microstructured molds and microstructured liners. Examples of suitable curable mixtures include thermoset materials such as the curable materials used to prepare polyurethanes, polyepoxides, polyacrylates, silicones, and the like. The cast and cure method can be used to provide a microstructured surface on either an optical film substrate or a glazing substrate.

Laminates Comprising Light Redirecting Films

In some embodiments, the optical film may be laminated to a glazing or any other suitable substrate. Typically, this surface of the optical film to be placed in contact with the glazing or substrate contains a coating, such as an adhesive coating, which adheres the light redirecting film to the glazing or substrate surface. Examples of suitable adhesives include, for example, heat activated adhesives, pressure sensitive adhesives or curable adhesives. Examples of suitable optically clear curable adhesives include those described in U.S. Pat. No. 6,887,917 (Yang et al.). Depending upon the nature of the adhesive, the adhesive coating may have a release liner attached to it to protect the adhesive coating from premature adhesion to surfaces and from dirt and other debris which can adhere to the adhesive surface. The release liner typically remains in place until the light redirecting laminate is to be attached to the glazing or substrate. Typically, a pressure sensitive adhesive is used.

A wide variety of pressure sensitive adhesive compositions are suitable. In some embodiments, the pressure sensitive adhesive is optically clear. The pressure sensitive adhesive component can be any material that has pressure sensitive adhesive properties. Additionally, the pressure sensitive adhesive component can be a single pressure sensitive adhesive or the pressure sensitive adhesive can be a combination of two or more pressure sensitive adhesives.

Suitable pressure sensitive adhesives include, for example, those based on natural rubbers, synthetic rubbers, styrene block copolymers, polyvinyl ethers, poly(meth)acrylates (including both acrylates and methacrylates), polyolefins, silicones, or polyvinyl butyral.

The optically clear pressure sensitive adhesives may be (meth)acrylate-based pressure sensitive adhesives. Useful alkyl (meth)acrylates (i.e., acrylic acid alkyl ester monomers) include linear or branched monofunctional unsaturated acrylates or methacrylates of non-tertiary alkyl alcohols, the alkyl groups of which have from 4 to 14 and, in particular, from 4 to 12 carbon atoms. Poly(meth)acrylic pressure sensitive adhesives are derived from, for example, at least one alkyl (meth)acrylate ester monomer such as, for example, isooctyl acrylate, isononyl acrylate, 2-methylbutyl acrylate, 2-ethyl-n-hexyl acrylate and n-butyl acrylate, isobutyl acrylate, hexyl acrylate, n-octyl acrylate, n-octyl methacrylate, n-nonyl acrylate, isoamyl acrylate, n-decyl acrylate, isodecyl acrylate, isodecyl methacrylate, isobornyl acrylate, 4-methyl-2-pentyl acrylate and dodecyl acrylate; and at least one optional co monomer component such as, for example, (meth)acrylic acid, vinyl acetate, N-vinyl pyrrolidone, (meth)acrylamide, a vinyl ester, a fumarate, a styrene macromer, alkyl maleates and alkyl fumarates (based, respectively, on maleic and fumaric acid), or combinations thereof.

In some embodiments, a heat activatable adhesive layer can be used, such as polyvinyl butyral or other thermoplastic adhesives, or blends thereof. The polyvinyl butyral resin may include about 20 to 80 or perhaps about 25 to 60 parts of plasticizer per hundred parts of resin. Examples of suitable plasticizers include esters of a polybasic acid or a polyhydric alcohol. Suitable plasticizers are triethylene glycol bis(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyl adipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217.

The adhesive layer may be crosslinked. The adhesives can be crosslinked by heat, moisture or radiation, forming covalently crosslinked networks which modify the adhesive's flowing capabilities. Crosslinking agents can be added to all types of adhesive formulations but, depending on the coating and processing conditions, curing can be activated by thermal or radiation energy, or by moisture. In cases in which crosslinker addition is undesirable one can crosslink the adhesive if desired by exposure to an electron beam.

The degree of crosslinking can be controlled to meet specific performance requirements. The adhesive can optionally further comprise one or more additives. Depending on the method of polymerization, the coating method, the end use, etc., additives selected from the group consisting of initiators, fillers, plasticizers, tackifiers, chain transfer agents, foaming agents, antioxidants, stabilizers, fire retardants, viscosity enhancing agents, and mixtures thereof can be used.

In addition to being optically clear, the pressure sensitive adhesive may have additional features that make it suitable for lamination to large substrates such as windows. Among these additional features is temporary removability. Temporarily removable adhesives are those with relatively low initial adhesion, permitting temporary removability from, and repositionability on, a substrate, with a building of adhesion over time to form a sufficiently strong bond. Examples of temporarily removable adhesives are described, for example in U.S. Pat. No. 4,693,935 (Mazurek). Alternatively, or in addition, to being temporarily removable, the pressure sensitive adhesive layer may contain a microstructured surface. This microstructured surface permits air egress as the adhesive is laminated to a substrate. For optical applications, typically, the adhesive will wet out the surface of the substrate and flow to a sufficient extent that the microstructures disappear over time and therefore do not affect the optical properties of the adhesive layer. A microstructured adhesive surface may be obtained by contacting the adhesive surface to a microstructuring tool, such as a release liner with a microstructured surface.

The pressure sensitive adhesive may be inherently tacky. If desired, tackifiers may be added to a base material to form the pressure sensitive adhesive. Useful tackifiers include, for example, rosin ester resins, aromatic hydrocarbon resins, aliphatic hydrocarbon resins, and terpene resins. Other materials can be added for special purposes, including, for example, oils, plasticizers, antioxidants, ultraviolet ("UV") stabilizers, hydrogenated butyl rubber, pigments, curing agents, polymer additives, thickening agents, chain transfer agents and other additives provided that they do not reduce the optical clarity of the pressure sensitive adhesive. In some embodiments, the pressure sensitive adhesive may contain a UV absorber (UVA) or hindered amine light stabilizer (HALS). Suitable UVAs include, for example, benzotriazole UVAs such as the compounds available from Ciba, Tarrytown, N.Y. as TINUVIN P, 213, 234, 326, 327, 328, 405 and 571. Suitable HALS include compounds available from Ciba, Tarrytown, N.Y. as TINUVIN 123, 144, and 292.

The pressure sensitive adhesive of the present disclosure exhibits desirable optical properties, such as, for example, controlled luminous transmission and haze. In some embodiments, substrates coated with the pressure sensitive adhesive may have substantially the same luminous transmission as the substrate alone.

Additional Functionality Using Laminates

Besides being the carrier and support layer for the microstructured surface, the optical film can also provide additional functionality to the light redirecting film. For example, the optical film can be a multilayer film that can reflect infrared light. In this way the light redirecting laminate can also help to keep the undesirable infrared light (heat) out of the building while allowing the desirable visible light into the building. Examples of suitable multilayer films useful as the optical film include those disclosed, for example, in U.S. Pat. Nos. 6,049,419, 5,223,465, 5,882,774, 6,049,419, RE 34,605, 5,579,162 and 5,360,659. In some embodiments, the optical film is a multilayer film in which the alternating polymeric layers cooperate to reflect infrared light. In some embodiments, at least one of the polymeric layers is a birefringent polymer layer.

The optical film may have additional coatings on the major surface not containing the microstructured prismatic elements in addition to, or instead of, the adhesive coating already described. For example, the second major surface may contain an anti-glare coating. Using suitable techniques, an additional layer or coating can be added to the optical substrate on the same major surface where the microstructured prismatic elements are located. This type of constructions have the same type of functionality provided by constructions described above where two separate panes or glazings are used.

Additionally, the optical film may be designed to provide additional advantageous structural features to glazing laminates besides the above-described optical features. The presence of a film laminated between two glazing substrates typically improves the strength and shatter resistance of the glazing laminates. Such properties can be enhanced by, for example, including shatter resistant or tear resistant features to the optical film. Such features can be provided by selection of materials that have such features or using films of an appropriate thickness to give such features if the optical film is a single film layer or by incorporating films which have such features if the optical film is a multilayer film.

Windows and Glazing Articles

In some embodiments, the light management constructions of this disclosure may be attached to glazing substrates to provide articles, such as windows or glazing articles with light redirecting properties. In certain embodiments, the light management construction is a film that is laminated between two glazing substrates. The glazing substrates comprise an inner surface and an outer surface. In one embodiment, the light management film is laminated between the two inner surfaces of the glazing substrates. In one embodiment, the glazing substrates are at least optically transparent, and may be optically clear. Examples or suitable glazing substrates may be prepared from a variety of different materials including, for example, a variety of different types of glass or from polymeric materials such as polyolefins, polyimides, polycarbonates or polymethyl methacrylates. In some embodiments, the glazing substrate may also comprise additional layers or treatments. Examples of additional layers include, for example, additional layers of film designed to provide glare reduction, tinting, shatter resistance and the like. Examples of additional treatments that may be present on glazing substrates include, for example, coatings or various types such as hardcoats, and etchings such as decorative etchings.

In embodiments where the light management construction comprises a microstructured surface on a glazing substrate, the microstructured glazing substrate may be incorporated into a multilayer glazing article. Such articles may be prepared by lamination of one or more additional glazing substrates to the microstructured glazing substrate. Typically, at least the microstructured surface of the microstructured glazing substrate is laminated to an additional glazing substrate, but additional glazing substrates and/or additional layers such as film layers or coatings may be included in the glazing article.

In some embodiments, the light management films contain an adhesive layer on a suitable surface of the optical film to laminate the film to a first glazing substrate. The adhesive layer may be protected by a release liner. The release liner may contain a microstructured surface to impart microstructuring to the adhesive surface and permit air egress as the light management film is laminated to the substrate. This air egress aids in the elimination of air bubbles in the lamination.

As mentioned above, the adhesive may also be removable, meaning adhesives with relatively low initial adhesion, permitting temporary removability from and repositionability on a substrate, with a building of adhesion over time to form a sufficiently strong bond. This can particularly useful when large areas of a substrate are to be laminated.

In certain embodiments, the lamination of an article, such as light management film, to a large surface substrate has been accomplished by what is sometimes called a "wet" application process. The wet application process involves spraying a liquid, typically a water/surfactant solution, onto the adhesive side of the large format article, and optionally onto the substrate surface. The liquid temporarily "detackifies" the pressure sensitive adhesive so the installer may handle, slide, and re-position the large format article into a desired position on the substrate surface. The liquid also allows the installer to pull the large format article apart if it sticks to itself or prematurely adheres to the surface of the substrate. Applying a liquid to the adhesive may also improve the appearance of the installed large format article by providing a smooth, bubble free appearance with good adhesion build on the surface of the substrate.

While the wet application process has been used successfully in many instances, it is a time consuming and messy process. Therefore, in certain embodiments, a "dry" application process may be generally desirable for installing large format graphic articles. Adhesives that are self wetting and removable may be applied with a dry installation process. The articles are easily attached to a large substrate because they are self wetting and yet they may be easily removed and repositioned as needed.

In other embodiments, an adhesive layer may be applied to the inner surface of the first glazing substrate. The adhesive layer on the first glazing substrate may be selected from the adhesives described above. The adhesive layer may be protected by a release liner or the adhesive layer may be applied to the first glazing substrate prior to lamination of the light management film.

Combination of Diffusers with Light Redirecting Films

A problem that is frequently encountered when an area is illuminated using natural daylight is how to spread the light adequately and evenly. In the case, for example, in which an area is being illuminated within a building, there will usually be parts of that area that are less well lit than others, and also some locations where the users of the building are troubled by glare from the light source. One solution to reduce glare is to introduce a diffuser layer in the optical path. The diffuser helps to spread out the solar column that may have been formed due to light going downwards after passing through the light redirecting film. In addition the diffuser layer provides more uniform ceiling illumination by diffusing the upward directed light as shown in FIG. 5.

Various diffusers have been developed and are known in the art. For example, the following patents and patent applications describe various type of diffusers: U.S. Patent Publication No. 2014/0104689, titled "Hybrid Light Redirecting and Light Diffusing Constructions, filed Dec. 5, 2013, (Padiyath, et al.); PCT Application Publication No. WO 2014/093119, titled "Brightness Enhancing Film with Embedded Diffuser", filed Dec. 5, 2013, (Boyd et al.); U.S. Pat. No. 6,288,172, titled "Light Diffusing Adhesive", issued Sep. 11, 2001 (Goetz, et al.); PCT Application Publication No. WO 2013/158475, titled "Brightness Enhancement Film with Substantially Non-imaging Embedded Diffuser", filed Apr. 12, 2013, (Boyd, et al.) The diffusers disclosed in the patents and patent applications in this paragraph are herein incorporated by reference. In general, any diffuser or diffusive layer, including those mentioned in this paragraph, and others known in the art, can be used in the constructions of this disclosure. In certain embodiments, any of the diffusers disclosed in the references of this paragraph can be used in combination, either as single construction or in a two-film solution, with light redirecting films comprising microstructured prismatic elements according to this disclosure.

In a study performed to exemplify the effect of a diffuser, the light output distribution of bare light redirecting film, shown in FIG. 5A, is compared with DRF/Diffuser construction (DRF before diffuser layer) at 45 degree illumination angle, shown in FIG. 5B. The diffuser layer spreads both the upward and downward directed light. The horizontal cross sections at 0 degree elevation are compared in FIG. 5B. The brightness of the solar column is proportional to the width and height of these peaks. The width of the peak increases and the peak height decreases by about two times with the addition of the diffuser. The use of the diffuser layer reduces glare and the visibility of the solar column significantly.

One option to combine the effect of a diffuser layer with a light redirecting film is to adhere the light redirecting film to the window and mount the diffuser to an added pane. In other embodiments, both the diffuser and the light redirecting film are laminated into a single construction that can then be applied to a glazing or other type of substrate as needed.

In some embodiments, the diffusing properties can lie within an adhesive used as part of the light redirecting construction, or with any of the substrates, such as the optical substrate, that may be used therein. In certain embodiments, the diffusing properties of any of the elements mentioned in the preceding sentence may be modified by introducing surface roughness, bulk diffusion, or embedded diffusers.

EXEMPLARY EMBODIMENTS

1. A light management construction comprising:
   an optical substrate having a first major surface and a second major surface opposite the first major surface;
   wherein a reference plane is defined as being parallel to, and in between, the first and second major surfaces of the optical substrate;
   wherein a reference x axis is defined as being normal to the reference plane;
   wherein a reference y axis is defined as being perpendicular to the reference x axis and falling within a plane that is parallel to the reference plane;
   wherein the reference x axis and the reference y axis intersect each other at a position defined as the origin, which is on the first major surface of the optical substrate;
   wherein the first major surface of the optical substrate comprises one or more microstructured prismatic elements;
   wherein the positive direction of the reference x axis is defined as the direction from the origin towards the one or more microstructured prismatic elements;
   wherein the positive direction of the reference y axis is defined as the direction from the origin in a counter-clock wise direction from the positive direction of the reference x axis;
   wherein a cross section of a microstructured prismatic element has a double peak shape with five substantially straight sides (sides A, B, C, D, and E) such that:
      each side of a microstructured prismatic element has a first end and a second end;
      side A of the microstructured prismatic element is parallel to and adjacent to the first major surface of the optical substrate and extends from the origin, where the first end of side A is located, in the positive direction of the reference y axis;
      the first end of side B of the microstructured prismatic element is connected to the second end of side A and the second end of side B is connected to the first end of side C;
         wherein side B extends from the point that is connected to side A towards the positive direction of the reference x axis;
         wherein side B forms an angle alpha with a line parallel to the reference x axis that passes through the point where side A and side B connect;
      the second end of side C of the microstructured prismatic element is connected to the first end side D;
         wherein side C extends from the point of intersection with side B in a clockwise direction;
      the second end of side D of the microstructured prismatic element is connected to the first end of side E;
      side C and side D define a valley angle, measured from side C in a clock-wise direction towards side D;
      the second end of side E of the microstructured prismatic element is connected to the first end side A;
         wherein side E forms an angle beta with the reference x axis that passes through the point where side A and side E connect;
      wherein the valley angle is from 10 to 170 degrees;
      wherein the shortest distance from side A to the highest point of the microstructured prismatic element defines the height of the microstructured prismatic element;
      wherein the length of side A defines the pitch of microstructured prismatic element;
      wherein the aspect ratio of the microstructured prismatic element defined by dividing the height by the pitch is 1.55 or less;
      wherein the distance between a normal line to side A that intersects the point where side B and side C connect and a normal line to side A that intersects the point where side C and side D connect defines the peak separation;

wherein the peak separation is greater than 10% of the pitch;

wherein when incident light rays pass through the second major surface of the optical substrate before they pass through the first major surface of the optical substrate and enter the microstructured prismatic element, total internal reflection within the microstructured prismatic element occurs at side E when the angle of the incident light rays is 65 degrees or less when measured clockwise from a line parallel to the reference x axis;

wherein when incident light rays pass through the second major surface of the optical substrate before they pass through the first major surface of the optical substrate and exit the light management construction as output light rays, the energy of the output light rays exiting at angles from 0 to 45 degrees measured clockwise from a line parallel to the reference x axis divided by the total energy of the output light rays is less than 25% at any value of an incident angle of the incident light rays from 10 to 65 degrees measured clockwise from a line parallel to the reference x axis.

2. A light management construction according to embodiment 1, wherein the pitch is from 20 to 60 microns.

3. A light management construction according to any of the preceding embodiments, wherein the pitch is from 35 to 45 microns.

4. A light management construction according to any of the preceding embodiments, wherein the pitch is from 45 to 55 microns.

5. A light management construction according to any of the preceding embodiments, wherein the pitch is 40 microns.

6. A light management construction according to any of the preceding embodiments, wherein the pitch is 50 microns.

7. A light management construction according to any of the preceding embodiments, wherein the height is less than 100 microns.

8. A light management construction according to any of the preceding embodiments, wherein the height is from 25 to 100 microns.

9. A light management construction according to any of the preceding embodiments, wherein the height is from 30 to 80 microns.

10. A light management construction according to any of the preceding embodiments, wherein the height is from 40 to 70 microns.

11. A light management construction according to any of the preceding embodiments, wherein the height is from 50 to 70 microns.

12. A light management construction according to any of the preceding embodiments, wherein the aspect ratio is from 1.0 to 1.5.

13. A light management construction according to any of the preceding embodiments, wherein the aspect ratio is from 1.1 to 1.4.

14. A light management construction according to any of the preceding embodiments, wherein the aspect ratio is from 1.15 to 1.25.

15. A light management construction according to any of the preceding embodiments, wherein the aspect ratio is from 1.25 to 1.35.

16. A light management construction according to any of the preceding embodiments, wherein the aspect ratio is from 1.35 to 1.45.

17. A light management construction according to any of the preceding embodiments, wherein the aspect ratio is from 1.45 to 1.55.

18. A light management construction according to any of the preceding embodiments, wherein the aspect ratio is about 1.2.

19. A light management construction according to any of the preceding embodiments, wherein the aspect ratio is about 1.3.

20. A light management construction according to any of the preceding embodiments, wherein the aspect ratio is about 1.4.

21. A light management construction according to any of the preceding embodiments, wherein the aspect ratio is about 1.5.

22. A light management construction according to any of the preceding embodiments, wherein the valley angle is from 20 degrees to 150 degrees.

23. A light management construction according to any of the preceding embodiments, wherein the valley angle is from 40 degrees to 90 degrees.

24. A light management construction according to any of the preceding embodiments, wherein the peak separation is greater than 15% of the pitch.

25. A light management construction according to any of the preceding embodiments, wherein the peak separation is greater than 20% of the pitch.

26. A light management construction according to any of the preceding embodiments, wherein the angle alpha is from 3 to 30 degrees.

27. A light management construction according to any of the preceding embodiments, wherein the angle alpha is from 5 to 28 degrees.

28. A light management construction according to any of the preceding embodiments, wherein the angle beta is from 5 to 15 degrees.

29. A light management construction according to any of the preceding embodiments, wherein the angle beta is from 5 to 10 degrees.

30. A light management construction according to any of the preceding embodiments, wherein the angle beta is from 7 to 10 degrees.

31. A light management construction according to any of the preceding embodiments, wherein the angle beta is 10 degrees or less.

32. A light management construction according to any of the preceding embodiments, wherein the angle beta is 9 degrees or less.

33. A light management construction according to any of the preceding embodiments, wherein the angle beta is 8 degrees or less.

34. A light management construction according to any of the preceding embodiments, wherein the angle beta is 7 degrees or less.

35. A light management construction according to any of the preceding embodiments, wherein the angle beta is 6 degrees or less.

36. A light management construction according to any of the preceding embodiments, wherein when incident light rays pass through the second major surface of the optical substrate before they pass through the first major surface of the optical substrate and exit the light management construction as output light rays, the energy of the output light rays exiting at angles from 0 to 45 degrees measured clockwise from a line parallel to the reference x axis divided by the total energy of the output light rays is less than 20% at any value of an incident angle of the incident light rays from 10 to 65 degrees measured clockwise from a line parallel to the reference x axis.

37. A light management construction according to any of the preceding embodiments, wherein when incident light rays pass through the second major surface of the optical substrate before they pass through the first major surface of the optical substrate and exit the light management construction as output light rays, the energy of the output light rays exiting at angles from 0 to 45 degrees measured clockwise from a line parallel to the reference x axis divided by the total energy of the output light rays is less than 18% at any value of an incident angle of the incident light rays from 10 to 65 degrees measured clockwise from a line parallel to the reference x axis.

38. A light management construction according to any of the preceding embodiments, wherein when incident light rays pass through the second surface of the optical substrate before they pass through the first major surface of the optical substrate and exit the light management construction as output light rays, the energy of the output light rays exiting at angles from 0 to 45 degrees measured clockwise from a line parallel to the reference x axis divided by the total energy of the output light rays is less than 15% at any value of an incident angle of the incident light rays from 10 to 65 degrees measured clockwise from a line parallel to the reference x axis.

39. A light management construction according to any of the preceding embodiments, wherein when incident light rays pass through the second surface of the optical substrate before they pass through the first major surface of the optical substrate and exit the light management construction as output light rays, the energy of the output light rays exiting at angles from 0 to 45 degrees measured clockwise from a line parallel to the reference x axis divided by the total energy of the output light rays is less than 13% at any value of an incident angle of the incident light rays from 10 to 65 degrees measured clockwise from a line parallel to the reference x axis.

40. A light management construction according to any of the preceding embodiments, wherein when incident light rays pass through the second surface of the optical substrate before they pass through the first major surface of the optical substrate and exit the light management construction as output light rays, the energy of the output light rays exiting at angles from 0 to 45 degrees measured clockwise from a line parallel to the reference x axis divided by the total energy of the output light rays is less than 10% at any value of an incident angle of the incident light rays from 10 to 65 degrees measured clockwise from a line parallel to the reference x axis.

41. A light management construction according to any of the preceding embodiments, wherein when incident light rays pass through the second surface of the optical substrate before they pass through the first major surface of the optical substrate and enter the microstructured prismatic element, total internal reflection within the microstructured prismatic element occurs at side E when the angle of the incident light rays is 68 degrees or less.

42. A light management construction according to any of the preceding embodiments, wherein when incident light rays pass through the second surface of the optical substrate before they pass through the first major surface of the optical substrate and enter the microstructured prismatic element, total internal reflection within the microstructured prismatic element occurs at side E when the angle of the incident light rays is 70 degrees or less.

43. A light management construction according to any of the preceding embodiments, wherein when incident light rays pass through the second surface of the optical substrate before they pass through the first major surface of the optical substrate and enter the microstructured prismatic element, total internal reflection within the microstructured prismatic element occurs at side E when the angle of the incident light rays is 75 degrees or less.

44. A light management construction according to any of the preceding embodiments, wherein when incident light rays pass through the second surface of the optical substrate before they pass through the first major surface of the optical substrate and enter the microstructured prismatic element, total internal reflection within the microstructured prismatic element occurs at side E when the angle of the incident light rays is 80 degrees or less.

45. A light management construction according to any of the preceding embodiments, wherein when incident light rays pass through the second surface of the optical substrate before they pass through the first major surface of the optical substrate and enter the microstructured prismatic element, total internal reflection within the microstructured prismatic element occurs at side E when the angle of the incident light rays is 85 degrees or less.

46. A light management construction according to any of the preceding embodiments, wherein the microstructured prismatic element is symmetric with respect to an axis that is parallel to the reference x axis and intersects side A at its middle point.

47. A light management construction according to any of the preceding embodiments comprising a symmetric microstructured prismatic element, wherein the pitch is from 20 to 60 microns.

48. A light management construction according to any of the preceding embodiments comprising a symmetric microstructured prismatic element, wherein the height is from 30 to 90 microns.

49. A light management construction according to any of the preceding embodiments comprising a symmetric microstructured prismatic element, wherein the aspect ratio is less than 1.5.

50. A light management construction according to any of the preceding embodiments comprising a symmetric microstructured prismatic element, wherein the valley angle is from 30 to 90 degrees.

51. A light management construction according to any of the preceding embodiments comprising a symmetric microstructured prismatic element, wherein the angle alpha is from 5 to 15 degrees.

52. A light management construction according to any of the preceding embodiments, wherein the peaks and/or valleys of the microstructured prismatic element are chamfered.

53. A light management construction according to any of the preceding embodiments, wherein there is a gap in between microstructured prismatic elements.

54. A light management construction according to any of the preceding embodiments, wherein:
the pitch is from 35 to 55 microns;
the height is from 45 to 78 microns;
the aspect ratio is from 1.2 to 1.5;
the valley angle is from 60 to 80 degrees;
the angle alpha is from 15 to 25 degrees; and
the angle beta is from 5 to 15 degrees.

55. A light management construction according to any of the preceding embodiments, wherein:
the pitch is about 40 microns;
the height is about 55 microns;
the aspect ratio is about 1.4;
the valley angle is about 72 degrees;
the angle alpha is about 17 degrees; and
the angle beta is about 10 degrees.

56. A light management construction according to any of the preceding embodiments, wherein the microstructured prismatic element is symmetric and, wherein:
   the pitch is from 35 to 55 microns;
   the height is from 45 to 78 microns;
   the aspect ratio is from 1.2 to 1.5;
   the valley angle is from 60 to 80 degrees;
   the angle alpha is from 5 to 15 degrees; and
   the angle beta is from 5 to 15 degrees.
57. A light management construction according to any of the preceding embodiments, wherein the microstructured prismatic element is symmetric and, wherein:
   the pitch is about 40 microns;
   the height is about 55 microns;
   the aspect ratio is about 1.4;
   the valley angle is about 72 degrees;
   the angle alpha is about 10 degrees; and
   the angle beta is about 10 degrees.
58. A light management construction according to any of the preceding embodiments, wherein:
   the pitch is from 35 to 55 microns;
   the height is from 45 to 78 microns;
   the aspect ratio is from 1.2 to 1.4;
   the valley angle is from 60 to 80 degrees;
   the angle alpha is from 10 to 25 degrees; and
   the angle beta is from 5 to 16 degrees.
59. A light management construction according to any of the preceding embodiments, wherein:
   the pitch is about 40 microns;
   the height is about 52 microns;
   the aspect ratio is about 1.3;
   the valley angle is about 74 degrees;
   the angle alpha is about 17 degrees; and
   the angle beta is about 12 degrees.
60. A light management construction according to any of the preceding embodiments, wherein the light management construction further comprises a diffuser layer.
61. A light management construction according to any of the preceding embodiments, wherein the optical substrate is a diffuser.
62. A light management construction according to any of the preceding embodiments, wherein the light management construction further comprises a window film adhesive layer adjacent the second major surface of the optical substrate.
63. A light management construction according to any of the preceding embodiments, wherein the light management construction further comprises:
   a window film adhesive layer adjacent the second major surface of the optical substrate; and
   optionally a liner adjacent the window film adhesive layer.

EXAMPLES

These examples are merely for illustrative purposes only and are not meant to be limiting on the scope of the appended claims. All parts, percentages, ratios, etc. in the examples and the rest of the specification are by weight, unless noted otherwise.

Example 1

A Room-facing Microstructured Prismatic Element Design

A cross-section of the structure of the new film from this design is shown in FIG. 6.

The pitch of the microstructure is 50 um, the height is 66 um, and the aspect ratio is approximately 1.3. The valley angle is about 74 degrees, and angle beta is 11.6 degrees. The structured side of the film is designed to be room-facing.

After sunlight passes through the film, the majority of light is redirected upward toward the ceiling. There is some light redirected steeply downward, which does not cause glare. The residual light redirected into 0 to 45 degrees downward is minimal Using the glare definition in this application, the glare ratio is <20%. Since light intensity is very small in this angular region, the glare problem can easily be addressed by applying a light diffuser film, which also eliminates the solar column problem as is common with microstructured optical film.

Example 2

A Room-Facing Microstructured Prismatic Element Design

Figure 7:
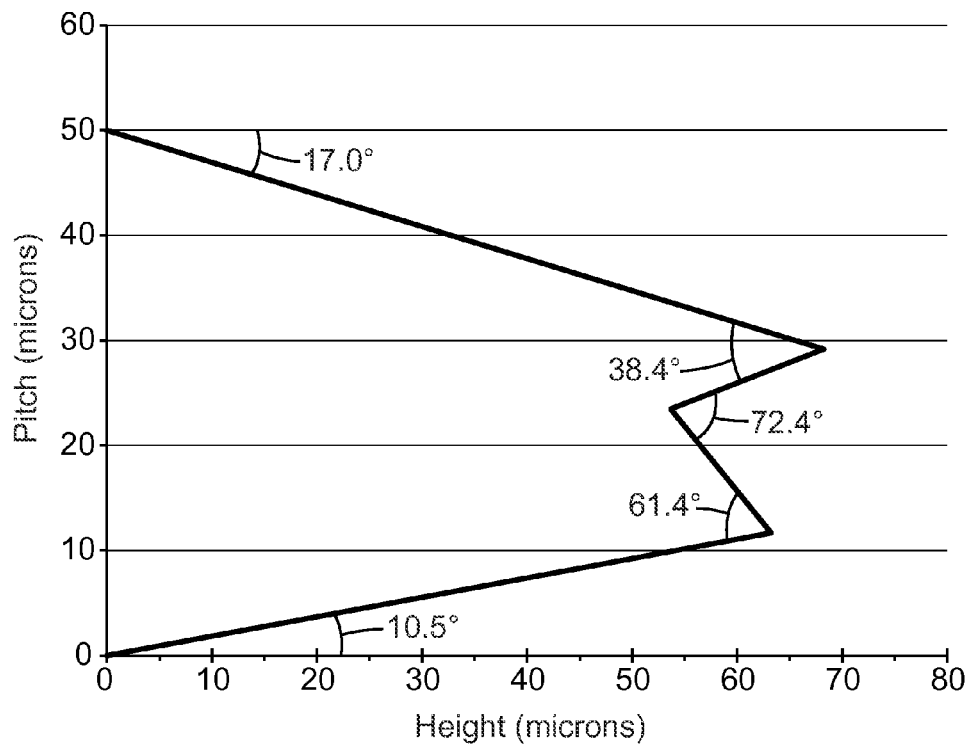
FIG. 7 shows a cross-section of another embodiment of a room-facing microstructured prismatic element as described in Example 2.

A cross-section of the structure of the new film from this design is shown in FIG. 7.

The pitch of the microstructure is 50 um, the height is 68 um and the aspect ratio is approximately 1.4. The valley angle is about 72 degrees, and angle beta is 10.5 degrees. This film can be used both room facing and sun facing.

After sunlight passes through the film, the majority of light is redirected upward toward the ceiling. There is some light redirected steeply downward, which does not cause glare. The residual light redirected into 0 to 45 degrees downward is minimal Using the glare definition in this application, the glare ratio is <20%. Since light intensity is very small in this angular region, the glare problem can easily be addressed by applying a light diffuser, which also eliminates the solar column problem as is common with microstructured optical film.

Example 3

A Room-facing Symmetric Microstructure Design

Figure 8:
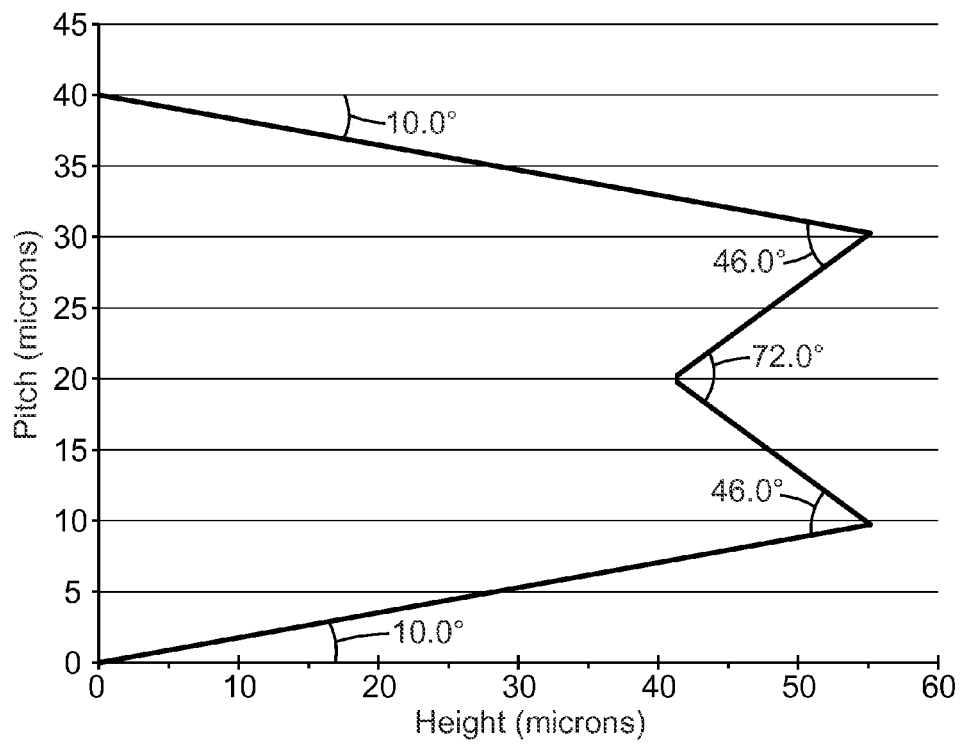
FIG. 8 shows a cross-section of another embodiment of a room-facing microstructured prismatic element as described in Example 3.

A cross-section of the structure of the new film from this design is shown in FIG. 8.

The pitch of the microstructure is 40 um, the height is 55 um and the aspect ratio is about 1.4. The valley angle is about 72 degrees, and angle beta is 10 degrees. The structured side of the film is designed to face the sun. It is a symmetric design.

After sunlight passes through the film, the majority of light is redirected upward toward the ceiling. There is some light redirected steeply downward, which does not cause glare. The residual light redirected into 0 to 45 degrees downward is minimal Using the glare definition in this application, the glare ratio is <25%. Since light intensity is very small in this angular region, the glare problem can easily be addressed by applying a light diffuser, which also eliminates the solar column problem as is common with microstructured optical film.

Glare Modeling Data

The optical performance of various light redirecting structures as a function of illumination (input) angle was modeled using ASAP Pro 2014 V1 SP1 optical modeling software from Breault Research Organization, Inc., Tucson, Ariz., with control functions and input and output files being created through the scientific software Mathematica from Wolfram Research, Inc., Champaign, Ill.

Each light redirecting structure design candidate film was constructed as a series of microstructures (teeth) formed upon a base film. For modeling purposes, the microstructures were assumed to be made of a 3M proprietary resin named Wrigley, and the base was assumed to be made of PET. Since the refractive index of resins generally differs with wavelength, a single specific representative wavelength of 532.5 nanometers in the green zone of the daylight spectrum was chosen for raytracing the models. At that wavelength, the tooth resin had a refractive index of 1.51475, and the refractive index of the base was 1.66. The base of each tooth was fixed at 40 microns with no gaps between teeth. Designs consisting of twenty teeth were determined to be sufficient for raytracing. The base film was 25 microns thick. Each tooth featured an unstructured layer of resin between the base film and the bottom of the tooth features. This unstructured layer is called "land" and represents how closely the manufacturing tool approaches the base film. In these models the land was taken to be two microns. A Monte Carlo statistical method of raytracing was employed. Source files representing incident sunlight within a chosen angular spread in solar elevation above horizontal were predetermined and used for raytracing with each design. The rays in each source file began at the same horizontal coordinate but were randomly placed spatially along a vertical coordinate span of one tooth pitch. Rays were assumed to lie within a plane normal to the film. All designs used the same source files. The total solar elevation spread was from zero degrees, representing horizontal solar incidence, to 90 degrees, representing vertical solar incidence. The total angular spread of 90 degrees was divided into one degree increments, creating a total of 90 source files. A given source file would contain source rays to be raytraced, with 1000 rays randomly oriented within the angular increment for that elevation, in these models, one degree spread. For instance, the first file would be for rays within the angular spread from zero to one degree solar elevation, the second file from one to two degrees, and so on up to the last source file from 89 to 90 degrees. In turn, the rays from one source file at a time for each angular increment were positioned above the center of the film span and ray traced starting from two microns before the film. Each ray would in general split and be partially transmitted and partially reflected at each interface between materials. This could occur many times for each ray and also for each of its split daughter rays. A detector was positioned two microns in front of the source rays to record the light intensity and direction of all reflected rays incident upon it. Another detector was positioned two microns past the film to record light intensity and direction for all transmitted rays. The detector ray data was binned within one degree increments to show the detector data distributions for the transmitted and reflected rays. From this data, glare, as defined in this application, was determined and plotted as a function of illumination angle. Lower values of glare at each illumination angle are desired.

Figure 9:
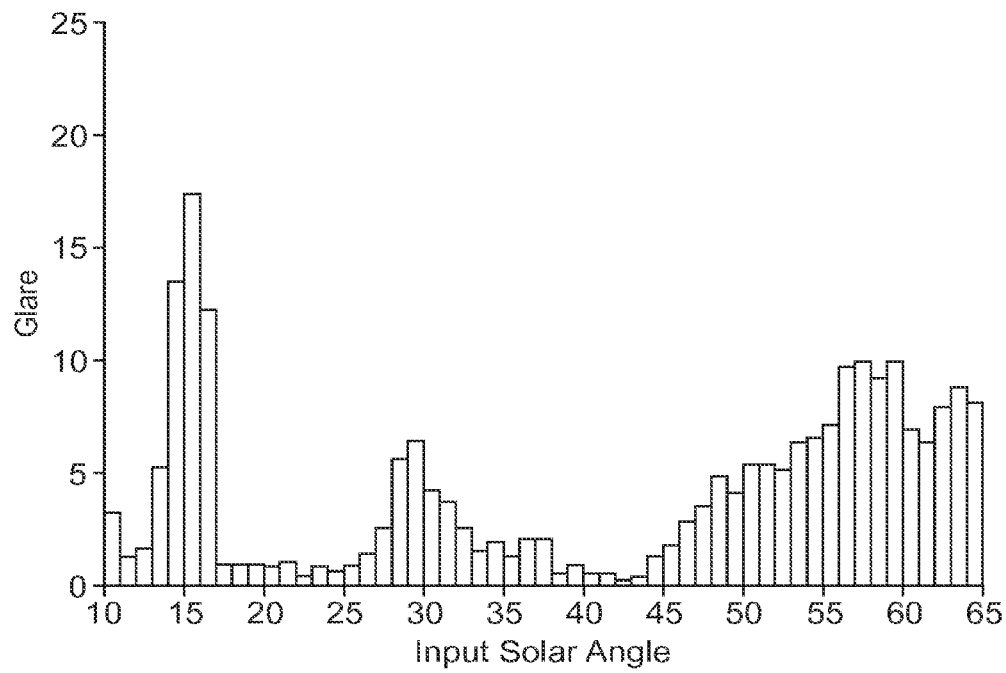
FIG. 9 presents glare modeling data for the structure of Example 1.
Figure 10:
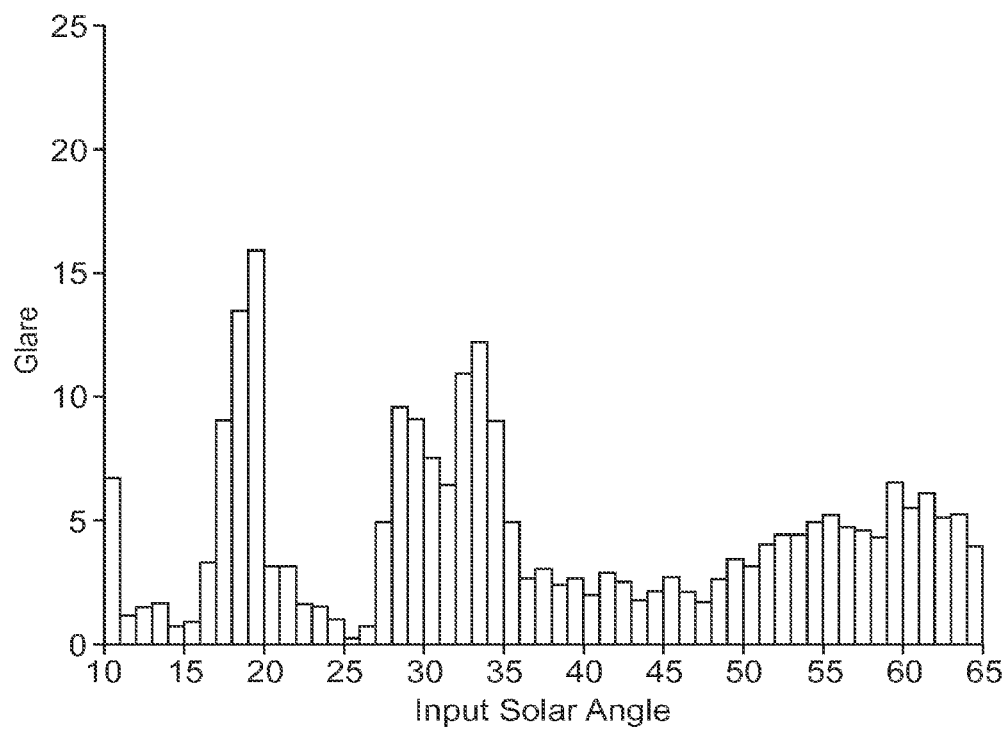
FIG. 10 presents glare modeling data for the structure of Example 2.
Figure 11:
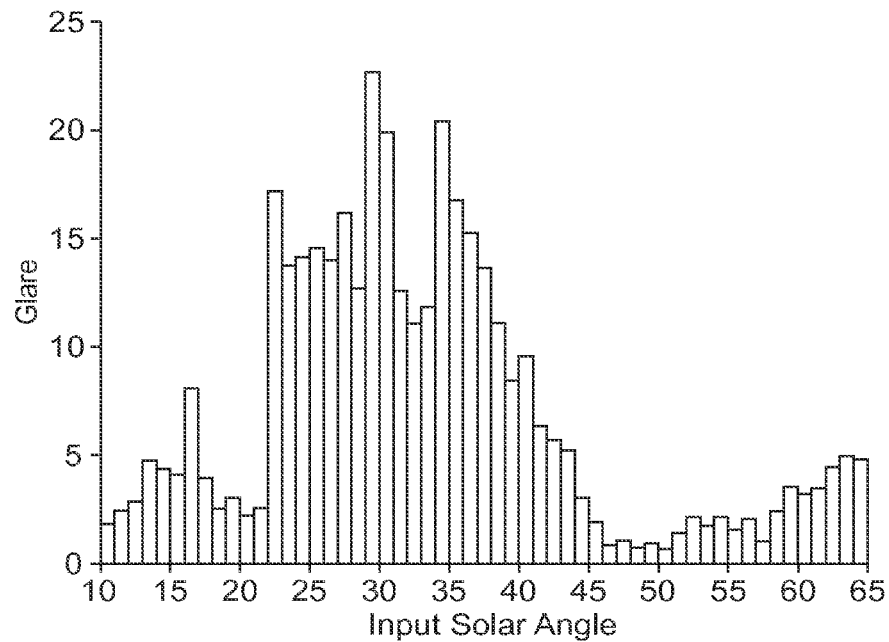
FIG. 11 presents glare modeling data for the structure of Example 3.

Glare modeling data for the structure from FIG. 6 is shown in FIG. 9. Glare modeling data for the structure from FIG. 7 is shown in FIG. 10. Glare modeling data for the structure from FIG. 8 is shown in FIG. 11.

Glare Measurement Data

Figure 12:
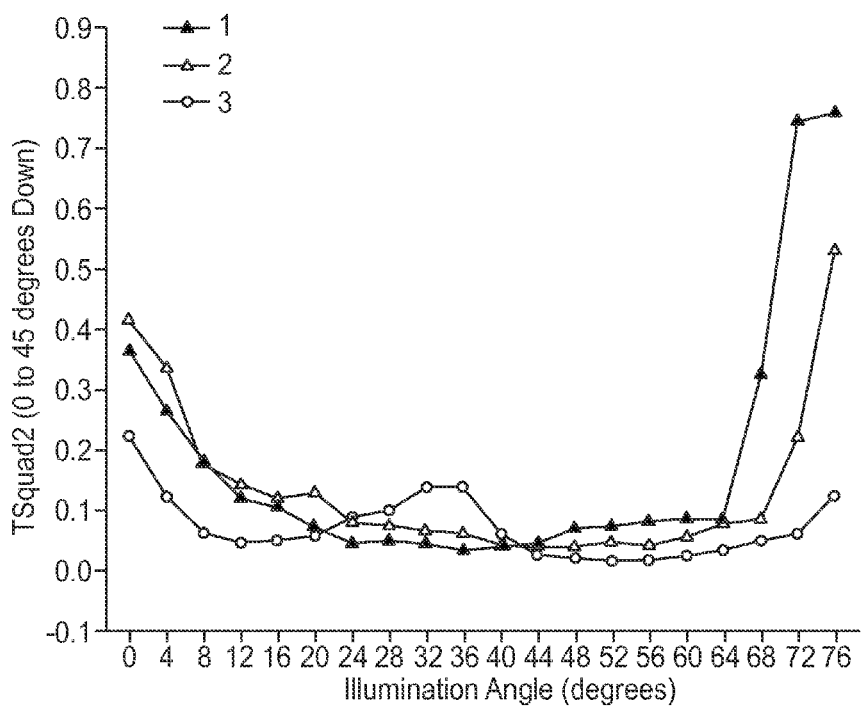
FIG. 12 presents measured glare data for embodiments of the invention.

The optical performance of various light redirecting structures as a function of illumination (input) angle was measured using an Imaging Sphere from Radiant Zemax (IS-SA-13-1). For each design, the angular distribution of the transmitted light (BTDF-Bidirectional Transmission Distribution Function) was measured for illumination (elevation) angles between 0 (head on) and 76 deg. Glare (TSQuad2) is defined as the amount of light transmitted between 0 and 45 deg downwards and was determined for each structure and illumination (elevation) angle from the measured BTDF. Results of these measurements are presented in FIG. 12, where the measured glare data for a structure having the same angles as Example 1 but with pitch of 40 microns is labeled 1, the measured glare data for the structure of Example 4 is labeled 2, and the measured glare data for the structure of Example 3 is labeled 3. Higher values at each illumination angle indicate more glare. For example at 12-16 degrees illumination angle the structure of Example 4 was determined to have the highest glare of all the structures shown in FIG. 12.

Fabrication of Films Comprising Microstructures

TABLE 1

| Materials | | |
|---|---|---|
| Description | Trade name | Source |
| Urethane acrylate oligomer | Photomer 6010 | BASF, Florham Park, NJ |
| Urethane acrylate oligomer | Photomer 6210 | BASF, Florham Park, NJ |
| Ethoxylated (10) bisphenol A diacrylate | SR602 | Sartomer Americas, Exton, PA |
| Ethoxylated (4) bisphenol A diacrylate | SR601 | Sartomer Americas, Exton, PA |
| Trimethylopropane triacrylate | SR351 | Sartomer Americas, Exton, PA |
| 1,6-Hexandiol diacrylate | SR238 | Sartomer Americas, Exton, PA |
| 2-Phenoxyethyl acrylate | Etermer 210 | Toagosei America Inc., West Jefferson, OH |
| Diphenyl(2,4,6-trimethylbenzoyl)phosphine oxide | Irgacure TPO | BASF, Florham Park, NJ |
| 2-Hydroxy-2-methyl-1-phenyl-propanone | Darocur 1173 | BASF, Florham Park, NJ |
| Poly(ethylene terephthalate) (PET) film, 50 micron thickness | — | 3M Company, St. Paul, MN |
| PET film, 5 mil thickness, with beaded hardcoat on one surface | Marnot XL Hardcoated Melinex ® .005 20 GU | Tekra, a Division of EIS Inc., New Berlin, WI |

TABLE 1-continued

Materials

| Description | Trade name | Source |
|---|---|---|
| PET film, 2 mil thickness, with beaded hardcoat on one surface | Marnot XL Hardcoated part # 22116296 (lot # CL13413) | Tekra, a Division of EIS Inc., New Berlin, WI |

Example 4

Fabrication of DRF

Photomer 6010, SR602, SR601, SR351, and Etermer 210 were combined in a weight ratio of 60/20/4/8/8 to produce a curable resin. Irgacure TPO and Darocur 1173 were added in respective weight ratios of 0.35 and 0.1 parts per 100 parts of resin. The substrate was 50 micron thick PET film produced by 3M Company.

Figure 13:
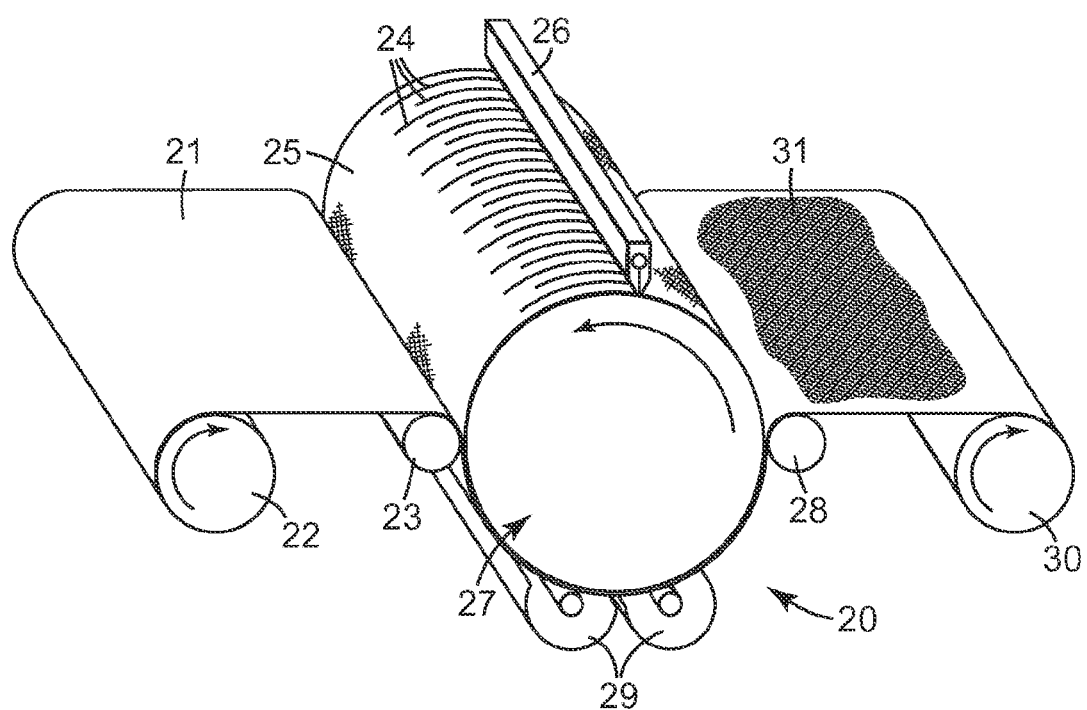
FIG. 13 is a perspective view of one exemplary process configuration for producing daylight redirecting film.

The microstructured prismatic elements were created using equipment 20 shown generally in FIG. 13, in which substrate 21 was supplied from roll 22. The curable resin was fed through a hose to coating die 26, and a substantial portion of the substrate 21 was coated with the resin prior to contacting the cylindrical tool 27. The cylindrical tool 27 comprised molding surface 25, which had microtooling 24 that was the inverse of the design shown in FIG. 7, except the design had a 40 micron pitch and a 55 micron height. The microtooling 24 was oriented on the molding surface 25 so that the microstructures produced were parallel to the machine or web direction of the substrate. The molding surface 25 was temperature controlled. The coated substrate passed around the bottom half of the tool 27 with 2 rollers 23, 28 positioned at 9 o'clock and 3 o'clock as the tool 27 rotated in a counterclockwise manner. The resin coated substrate 21 first contacted the molding surface 25 of the tool 27 at the first nip point created by the roller at the 9 o'clock position 23. A coating bead was formed at this nip point to smooth any irregularities in the resin coating on the substrate. The curable resin was then cured by exposure to two sources of actinic radiation 29 positioned to irradiate the resin as the molding surface 25 rotated past their 5 and 7 o'clock positions. The source of the actinic radiation was ultraviolet light supplied by D lamps in a Model F600 Fusion curing system available from Fusion UV Systems Inc., Gaithersburg, Md. Each row of lamps contained two lamps positioned perpendicular to the rotational direction of the molding roll. The distance between the lamps and the molding roll was set such that the molding surface 25 was at the focus of the lamps. Both rows of lamps were operated at 240 W/cm$^2$. Radiation passed through the substrate 21 and into the resin to effect cure while the resin was in direct contact with the molding surface 25. The product was microstructured composite 31 comprising the PET substrate and cured microstructured resin having the same angles and design as the structure shown in FIG. 7, except the structure had a 40 micron pitch and a 55 micron height. The microstructured composite 31 was pulled away from the molding surface 25 after the composite passed through the second nip point formed by the 3 o'clock roller 28. The daylight redirecting microstructured composite was subsequently stored on roll 30.

Other films were prepared in a similar manner, using different microstructure designs.

We claim:

1. A light management construction comprising:
an optical substrate having a first major surface and a second major surface opposite the first major surface;
wherein a reference plane is defined as being parallel to, and in between, the first and second major surfaces of the optical substrate;
wherein a reference x axis is defined as being normal to the reference plane;
wherein a reference y axis is defined as being perpendicular to the reference x axis and falling within a plane that is parallel to the reference plane;
wherein the reference x axis and the reference y axis intersect each other at a position defined as the origin, which is on the first major surface of the optical substrate;
wherein the first major surface of the optical substrate comprises one or more microstructured prismatic elements;
wherein the positive direction of the reference x axis is defined as the direction from the origin towards the one or more microstructured prismatic elements;
wherein the positive direction of the reference y axis is defined as the direction from the origin in a counterclockwise direction from the positive direction of the reference x axis;
wherein a cross section of a microstructured prismatic element has a double peak shape with five substantially straight sides (sides A, B, C, D, and E) such that:
each side of a microstructured prismatic element has a first end and a second end;
side A of the microstructured prismatic element is parallel to and adjacent to the first major surface of the optical substrate and extends from the origin, where the first end of side A is located, in the positive direction of the reference y axis;
the first end of side B of the microstructured prismatic element is connected to the second end of side A and the second end of side B is connected to the first end of side C;
wherein side B extends from the point that is connected to side A towards the positive direction of the reference x axis;
wherein side B forms an angle alpha with a line parallel to the reference x axis that passes through the point where side A and side B connect;
the second end of side C of the microstructured prismatic element is connected to the first end side D;
wherein side C extends from the point of intersection with side B in a clockwise direction;
the second end of side D of the microstructured prismatic element is connected to the first end of side E;
side C and side D define a valley angle, measured from side C in a clock-wise direction towards side D;
the second end of side E of the microstructured prismatic element is connected to the first end side A;

wherein side E forms an angle beta with the reference x axis that passes through the point where side A and side E connect;

wherein the valley angle is from 10 to 170 degrees;

wherein the shortest distance from side A to the highest point of the microstructured prismatic element defines the height of the microstructured prismatic element;

wherein the length of side A defines the pitch of microstructured prismatic element;

wherein the aspect ratio of the microstructured prismatic element defined by dividing the height by the pitch is 1.55 or less;

wherein the distance between a normal line to side A that intersects the point where side B and side C connect and a normal line to side A that intersects the point where side C and side D connect defines the peak separation;

wherein the peak separation is greater than 10% of the pitch;

wherein when incident light rays pass through the second major surface of the optical substrate before they pass through the first major surface of the optical substrate and enter the microstructured prismatic element, total internal reflection within the microstructured prismatic element occurs at side E when the angle of the incident light rays is 65 degrees or less when measured clockwise from a line parallel to the reference x axis;

wherein when incident light rays pass through the second major surface of the optical substrate before they pass through the first major surface of the optical substrate and exit the light management construction as output light rays, the energy of the output light rays exiting at angles from 0 to 45 degrees measured clockwise from a line parallel to the reference x axis divided by the total energy of the output light rays is less than 25% at any value of an incident angle of the incident light rays from 10 to 65 degrees measured clockwise from a line parallel to the reference x axis.

2. A light management construction according to claim 1, wherein the pitch is from 20 to 60 microns.

3. A light management construction according to claim 1, wherein the height is from 30 to 80 microns.

4. A light management construction according to claim 1, wherein the aspect ratio is from 1.0 to 1.5.

5. A light management construction according to claim 1, wherein the valley angle is from 40 degrees to 90 degrees.

6. A light management construction according to claim 1, wherein the peak separation is greater than 20% of the pitch.

7. A light management construction according to claim 1, wherein the angle alpha is from 5 to 28 degrees.

8. A light management construction according to claim 1, wherein the angle beta is 10 degrees or less.

9. A light management construction according to claim 1, wherein when incident light rays pass through the second major surface of the optical substrate before they pass through the first major surface of the optical substrate and exit the light management construction as output light rays, the energy of the output light rays exiting at angles from 0 to 45 degrees measured clockwise from a line parallel to the reference x axis divided by the total energy of the output light rays is less than 20% at any value of an incident angle of the incident light rays from 10 to 65 degrees measured clockwise from a line parallel to the reference x axis.

10. A light management construction according to claim 1, wherein when incident light rays pass through the second surface of the optical substrate before they pass through the first major surface of the optical substrate and enter the microstructured prismatic element, total internal reflection within the microstructured prismatic element occurs at side E when the angle of the incident light rays is 68 degrees or less.

11. A light management construction according to claim 1, wherein when incident light rays pass through the second surface of the optical substrate before they pass through the first major surface of the optical substrate and enter the microstructured prismatic element, total internal reflection within the microstructured prismatic element occurs at side E when the angle of the incident light rays is 75 degrees or less.

12. A light management construction according to claim 1, wherein:
the pitch is from 35 to 55 microns;
the height is from 45 to 78 microns;
the aspect ratio is from 1.2 to 1.5;
the valley angle is from 60 to 80 degrees;
the angle alpha is from 15 to 25 degrees; and
the angle beta is from 5 to 15 degrees.

13. A light management construction according to claim 1, wherein:
the pitch is about 40 microns;
the height is about 55 microns;
the aspect ratio is about 1.4;
the valley angle is about 72 degrees;
the angle alpha is about 17 degrees; and
the angle beta is about 10 degrees.

14. A light management construction according to claim 1, wherein the light management construction further comprises a diffuser layer.

15. A light management construction according to claim 1, wherein the light management construction further comprises a window film adhesive layer adjacent the second major surface of the optical substrate.

16. A light management construction according to claim 15, further comprising a liner adjacent the window film adhesive layer.

* * * * *